(12) United States Patent
Hiraiwa et al.

(10) Patent No.: US 11,124,149 B2
(45) Date of Patent: Sep. 21, 2021

(54) AIRBAG DEVICE WITH EXHAUST HOLE

(71) Applicant: TOYODA GOSEI CO., LTD., Kiyosu (JP)

(72) Inventors: Takuya Hiraiwa, Kiyosu (JP); Shinichi Ishida, Kiyosu (JP); Keita Suzuki, Nagoya (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 97 days.

(21) Appl. No.: 16/570,222

(22) Filed: Sep. 13, 2019

(65) Prior Publication Data
US 2020/0094768 A1 Mar. 26, 2020

(30) Foreign Application Priority Data
Sep. 26, 2018 (JP) .............................. JP2018-180841

(51) Int. Cl.
*B60R 21/239* (2006.01)
*B60R 21/233* (2006.01)
*B60R 21/2338* (2011.01)

(52) U.S. Cl.
CPC .......... *B60R 21/239* (2013.01); *B60R 21/233* (2013.01); *B60R 21/2338* (2013.01);
(Continued)

(58) Field of Classification Search
CPC . B60R 21/205; B60R 21/233; B60R 21/2338; B60R 21/239;
(Continued)

(56) References Cited

U.S. PATENT DOCUMENTS 6,648,371 B2* 11/2003 Vendely ................ B60R 21/217
280/739
7,413,218 B2* 8/2008 Ekdahl .................. B60R 21/239
280/736
(Continued)

FOREIGN PATENT DOCUMENTS

JP 2008-149940 A 7/2008
JP 2008-179231 A 8/2008
(Continued)

*Primary Examiner* — Laura Freedman
(74) *Attorney, Agent, or Firm* — Posz Law Group, PLC

(57) ABSTRACT

An airbag having an exhaust hole and an opening/closing control device configured to control opening and closing of the exhaust hole are provided. The airbag includes a bag body, and a discharge portion having the exhaust hole, the discharge portion is configured to maintain a blocked state of the exhaust hole by being drawn into the bag body at the time of inflation of the bag body in a state where connection between a connection member and the opening/closing control device is maintained, and to be inflated by protruding from the bag body at the time of inflation of the bag body in a state where the connection between the connection member and the opening/closing control device is released to open the exhaust hole. A dummy inflation portion inflated to partially protrude from the bag body is formed at a position approximately symmetrical to the discharge portion. A volume of the dummy inflation portion at the time of inflating completion is set to be smaller than a volume of the discharge portion in a state where the exhaust hole is open at the time of inflation.

7 Claims, 15 Drawing Sheets

(52) U.S. Cl.
CPC ............. *B60R 2021/2395* (2013.01); *B60R 2021/23382* (2013.01); *B60R 2021/23384* (2013.01)

(58) Field of Classification Search
CPC .......... B60R 2021/23308; B60R 2021/23382; B60R 2021/23384; B60R 2021/2395
See application file for complete search history.

(56) References Cited

U.S. PATENT DOCUMENTS

| | | | | |
|---|---|---|---|---|
| 7,600,782 B2* | 10/2009 | Ishiguro | ............... | B60R 21/239 280/739 |
| 7,810,841 B2* | 10/2010 | Fukawatase | .......... | B60R 21/239 280/739 |
| 8,322,748 B2* | 12/2012 | Abe | ..................... | B60R 21/239 280/739 |
| 8,388,021 B2* | 3/2013 | Mitsuo | .................. | B60R 21/239 280/743.2 |
| 8,500,166 B2* | 8/2013 | Inuzuka | ............. | B60R 21/2338 280/743.2 |
| 8,608,197 B2* | 12/2013 | Eckert | .................. | B60R 21/239 280/739 |
| 8,646,808 B2* | 2/2014 | Williams | ............. | B60R 21/239 280/743.2 |
| 8,777,260 B2* | 7/2014 | Kranzle | ............. | B60R 21/2338 280/740 |
| 8,864,170 B2* | 10/2014 | Yamada | ............. | B60R 21/2338 280/743.2 |
| 9,022,424 B2* | 5/2015 | Nakamura | .......... | B60R 21/2338 280/743.2 |
| 9,033,362 B2* | 5/2015 | Fukawatase | .......... | B60R 21/239 280/728.2 |
| 9,376,086 B2* | 6/2016 | Nebel | .................. | B60R 21/239 |
| 9,403,503 B2* | 8/2016 | Buchholz | ............. | B60R 21/239 |
| 9,434,346 B2* | 9/2016 | Weber | ................ | B60R 21/2165 |
| 9,758,124 B2* | 9/2017 | Kruse | ................ | B60R 21/2338 |
| 9,776,594 B2* | 10/2017 | Gammill | ............ | B60R 21/2338 |
| 2008/0211214 A1 | 9/2008 | Ishiguro et al. | | |
| 2009/0236837 A1 | 9/2009 | Fukawatase et al. | | |
| 2011/0309605 A1* | 12/2011 | Kumagai | ............. | B60R 21/239 280/741 |
| 2019/0299913 A1* | 10/2019 | Tanaka | .................. | B60R 21/233 |
| 2020/0156583 A1* | 5/2020 | Yamada | ............. | B60R 21/2338 |
| 2021/0031720 A1* | 2/2021 | Suzuki | .................. | B60R 21/231 |

FOREIGN PATENT DOCUMENTS

| | | | | |
|---|---|---|---|---|
| JP | 2009-227047 A | | 10/2009 | |
| JP | 2012171408 A | * | 9/2012 | ............ B60R 21/239 |

* cited by examiner

Fig. 9
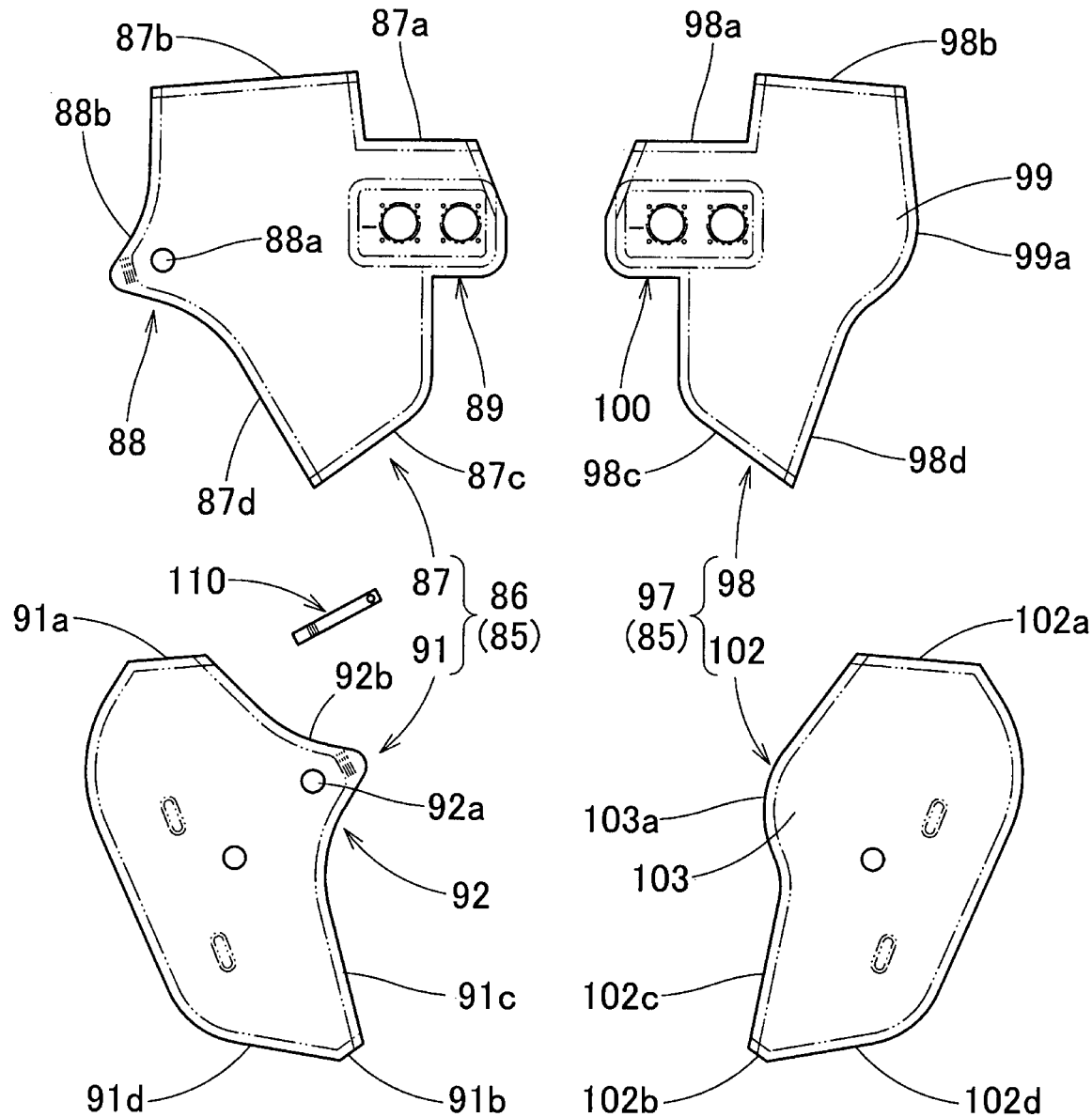
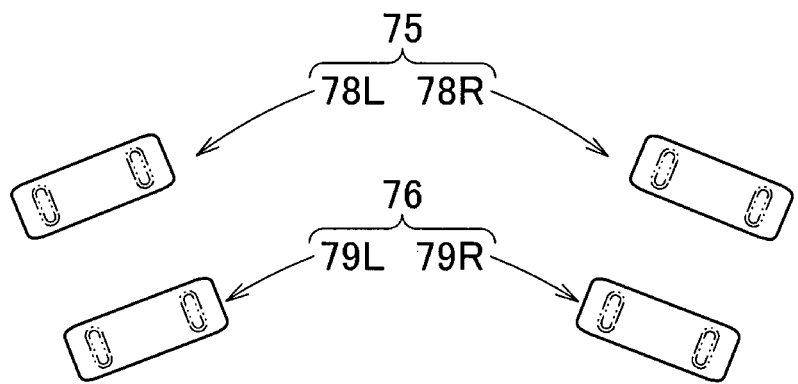

AIRBAG DEVICE WITH EXHAUST HOLE

CROSS REFERENCE TO RELATED APPLICATIONS

The Present application claims priority from Japanese Patent Application No. 2018-180841 of Hiraiwa et al., filed on Sep. 26, 2018, the entire disclosure of which is incorporated herein by reference.

BACKGROUND OF THE INVENTION

Field of the Invention

The invention relates to an airbag device including an airbag which is folded and housed in a housing part and is configured to be inflated to protrude from the housing part by an inflation gas flowing to the inside of the airbag, and of which an internal pressure at the time of inflating completion is controllable.

Background Art

In the related art, as an airbag device, JP-2009-227047 discloses a configuration in which an exhaust hole through which some of the inflation gas is discharged is provided to a passenger seat airbag, opening and closing of the exhaust hole are controlled by an opening/closing control device in accordance with a physique and a sitting position of an occupant sitting on a seat, and an internal pressure of the airbag at the time of inflation is controlled. In the airbag device in the related art, the airbag includes a bag body, a tube-shaped discharge portion including the exhaust hole on a distal end side, and a connection member which connects the discharge portion to the opening/closing control device side. The discharge portion is configured to maintain a blocked state of the exhaust hole by being drawn into the bag body at the time of inflation of the bag body in a state where connection between the connection member and the opening/closing control device is maintained, and to open the exhaust hole by partially protruding outwardly from the bag body by the release of the drawing into the bag body at the time of inflation of the bag body in a state where connection between the connection member and the opening/closing control device is released.

In addition, in the airbag device in the related art, the discharge portion is disposed in a left side region of a peripheral wall portion of the bag body, and in the airbag, a dummy tube that is inflated to partially protrude in a tube shape from the bag body is formed in a right side region of the peripheral wall portion, which is symmetrical to the discharge portion. In order to inflate the bag body in a balanced manner, the dummy tube is provided in a manner that the outer shape of the dummy tube is approximately the same as that of the discharge portion and the dummy tube is inflated to partially protrude from the bag body at a position approximately symmetrical to the discharge portion, at the time of deployment and inflation of the bag body in a state where the discharge portion protrudes to open the exhaust hole.

However, in the airbag device in the related art, since the dummy tube is also connected to the opening/closing control device side by a second connection member extending from the distal end side and the connection between the dummy tube and the opening/closing control device is configured to be maintained or released, the configuration is complex, and thus there is room for improvement in terms of simplifying the configuration.

SUMMARY OF THE INVENTION

An object of the invention is to provide an airbag device which can accurately protect an occupant by an inflated airbag with a simple configuration.

The object of the invention can be achieved by an airbag device having the following configuration.

The airbag device includes an airbag which is folded and housed in a housing part, is configured to be inflated to protrude from the housing part by an inflation gas flowing to an inside of the airbag, and includes an exhaust hole through which some of the inflation gas flowing to the inside is discharged when the exhaust hole is open; and an opening/closing control device disposed on the housing part side and configured to control opening and closing of the exhaust hole, in which the airbag includes a bag body which has a bag shape with flexibility and includes an inlet opening through which the inflation gas flows to the inside, and in which a peripheral edge of the inlet opening is connected to the housing part side, a discharge portion having the exhaust hole, a connection member which is disposed in the bag body, and of which a proximal portion side is connected to the discharge portion and a distal end side is connected to the opening/closing control device disposed near the inlet opening, and a dummy inflation portion that is disposed at a position approximately symmetrical to the discharge portion with a part where the inlet opening is provided as a center, and is inflated to partially protrude from the bag body at the time of inflation of the bag body, the discharge portion is configured to maintain a blocked state of the exhaust hole by wall portions around the exhaust hole being pressed against each other in a state where the discharge portion is drawn into the bag body at the time of inflation of the bag body in a state where connection with the connection member is maintained, and is configured to protrude from the bag body by releasing the drawing into the bag body at the time of inflation of the bag body in a state where connection between the connection member and the opening/closing control device is released, to be inflated to separate the wall portions from each other by the inflation gas flowing to the inside to open the exhaust hole, and a volume of the dummy inflation portion at the time of inflating completion is set to be smaller than a volume of the discharge portion in a state where the exhaust hole is open at the time of inflation.

In the airbag device of the invention, the airbag is configured such that the dummy inflation portion is provided at a position approximately symmetrical to the discharge portion at the time of inflating completion, but the dummy inflation portion is configured to be inflated to partially protrude from the bag body by the inflation gas flowing to the inside at the time of deployment and inflation of the airbag, regardless of the behavior of the discharge portion (operation of the opening/closing control device). That is, in the airbag device of the invention, the dummy inflation portion is not connected to the opening/closing control device side, and only the connection member extending from the discharge portion is connected to the opening/closing control device. Therefore, it is possible to configure the device itself with a simple configuration as compared with an airbag device in the related art in which the dummy inflation portion is also connected to the opening/closing control device side. In the airbag device of the invention, since the dummy inflation portion is provided, in a case where the discharge portion is inflated to protrude outwardly from the bag body so as to open the exhaust hole by releasing the connection between the connection member and the opening/closing control device, the dummy inflation portion also partially protrudes to be disposed at a position approximately symmetrical to the discharge portion, and thus the bag body can be inflated symmetrically in a balanced manner. Further, in the airbag device of the invention, in a case where the discharge portion is inflated in a state of being drawn into the bag body by the connection between the connection member and the opening/closing control device being maintained, only the dummy inflation portion partially protrudes from the bag body, and the airbag is inflated in an asymmetric state. However, in the airbag device of the invention, since the volume of the dummy inflation portion at the time of inflating completion is set to be smaller than the volume of the discharge portion in a state where the exhaust hole is open at the time of inflation, the bag body can be stably inflated without greatly losing balance.

Accordingly, in the airbag device of the invention, it is possible to accurately protect an occupant by the inflated airbag with a simple configuration.

In addition, in the airbag device of the invention, in a case where the airbag is a passenger seat airbag that is folded and housed in front of a passenger seat, it is preferable that the bag body has an approximately quadrangular pyramid shape of which an apex portion is disposed on a front end side, as a shape at the time of inflating completion, and includes an occupant side wall portion disposed on a rear end side as an occupant side at the time of inflating completion, along an approximately vertical direction, and a peripheral wall portion having a tapered shape which extends forward from a peripheral edge of the occupant side wall portion and converges toward the front end side, the discharge portion and the dummy inflation portion are respectively provided in regions opposite in a right-left direction in the peripheral wall portion, the bag body is formed of a base material made of a flexible sheet, and is configured such that at least a part of the peripheral wall portion is divided into approximately two of the discharge portion side and the dummy inflation portion side in the right-left direction, in the peripheral wall portion, a discharge-portion-side part including the discharge portion is formed by binding peripheral edges of a pair of discharge-portion-side part constituting portions configured to divide the discharge-portion-side part in a front-rear direction, in the peripheral wall portion, a dummy-inflation-portion-side part including the dummy inflation portion is formed by binding peripheral edges of a pair of dummy-inflation-portion-side part constituting portions configured to divide the dummy-inflation-portion-side part in the front-rear direction, in the peripheral wall portion, a central side binding part which is provided along the front-rear direction by binding peripheral edges of the discharge-portion-side part constituting portions and the dummy-inflation-portion-side part constituting portions is provided in a region disposed on the upper surface side, and a discharge-portion-side binding part formed by binding the peripheral edges of the discharge-portion-side part constituting portions and a dummy-inflation-portion-side binding part formed by binding the peripheral edges of the dummy-inflation-portion-side part constituting portion are provided such that edges of the discharge-portion-side binding part and the dummy-inflation-portion-side binding part are bound to the central side binding part, and the discharge-portion-side binding part and the dummy-inflation-portion-side binding part are disposed at positions where binding parts to the central side binding part are shifted in the front-rear direction.

With the above-described configuration of the airbag device, in the airbag at the time of inflating completion, it is possible to suppress that parts becoming bulky (harden) by binding the peripheral edges of the base material are disposed to be concentrated in the vicinity of the center, in the right-left direction, of a region on the upper surface side provided on the windshield side. Therefore, even in a case where the upper surface side of the airbag at the time of inflating completion is provided to be close to the windshield, it is possible to suppress a damage on the windshield due to the inflated airbag.

BRIEF DESCRIPTION OF THE DRAWINGS

FIGS. 9 and 10 are plan views illustrating base cloths constituting the airbag of FIG. 3.

DETAILED DESCRIPTION OF THE INVENTION

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
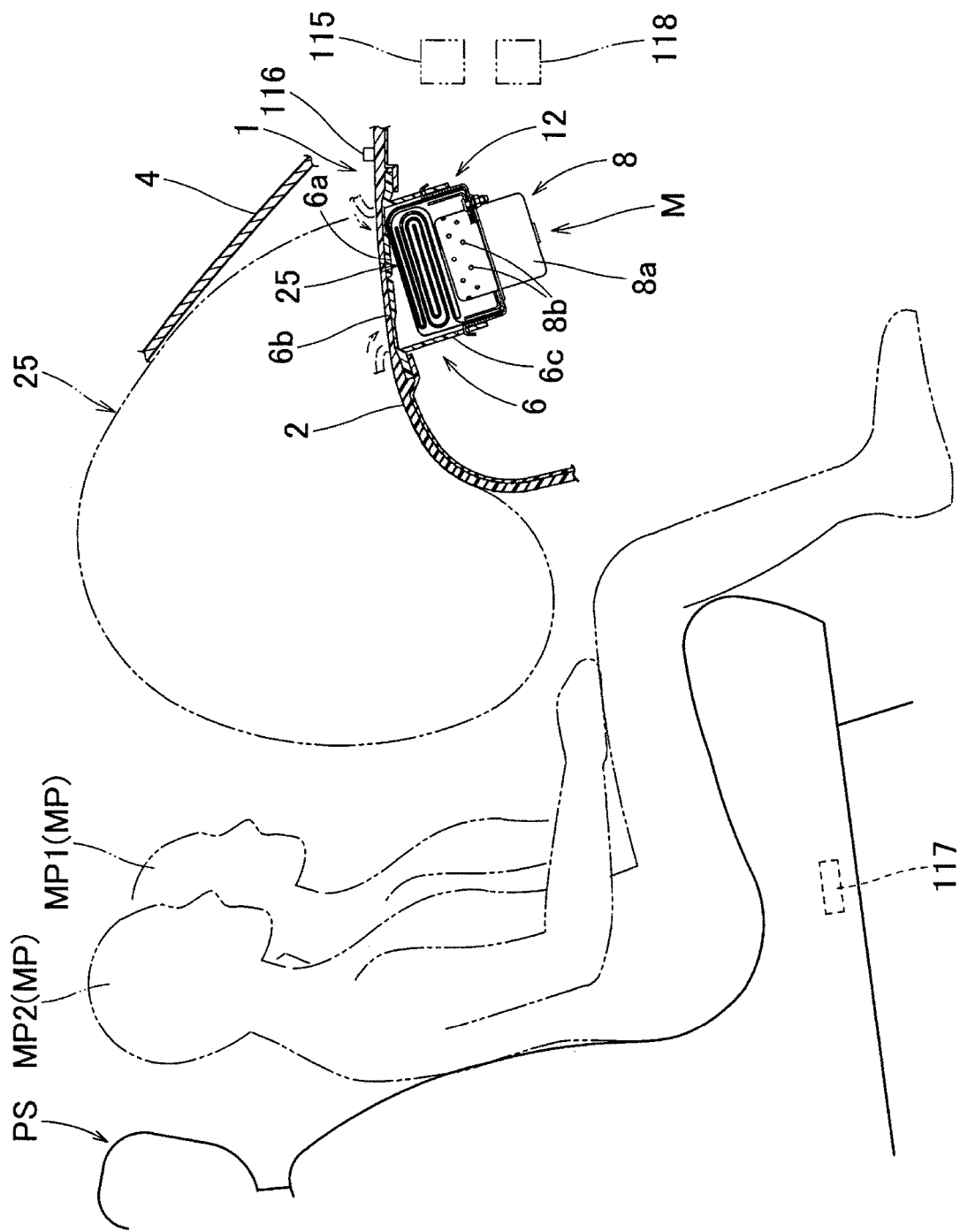
FIG. 1 is a schematic view illustrating the vicinity of a part where a passenger seat airbag device as an embodiment of the invention is mounted.
Figure 2:
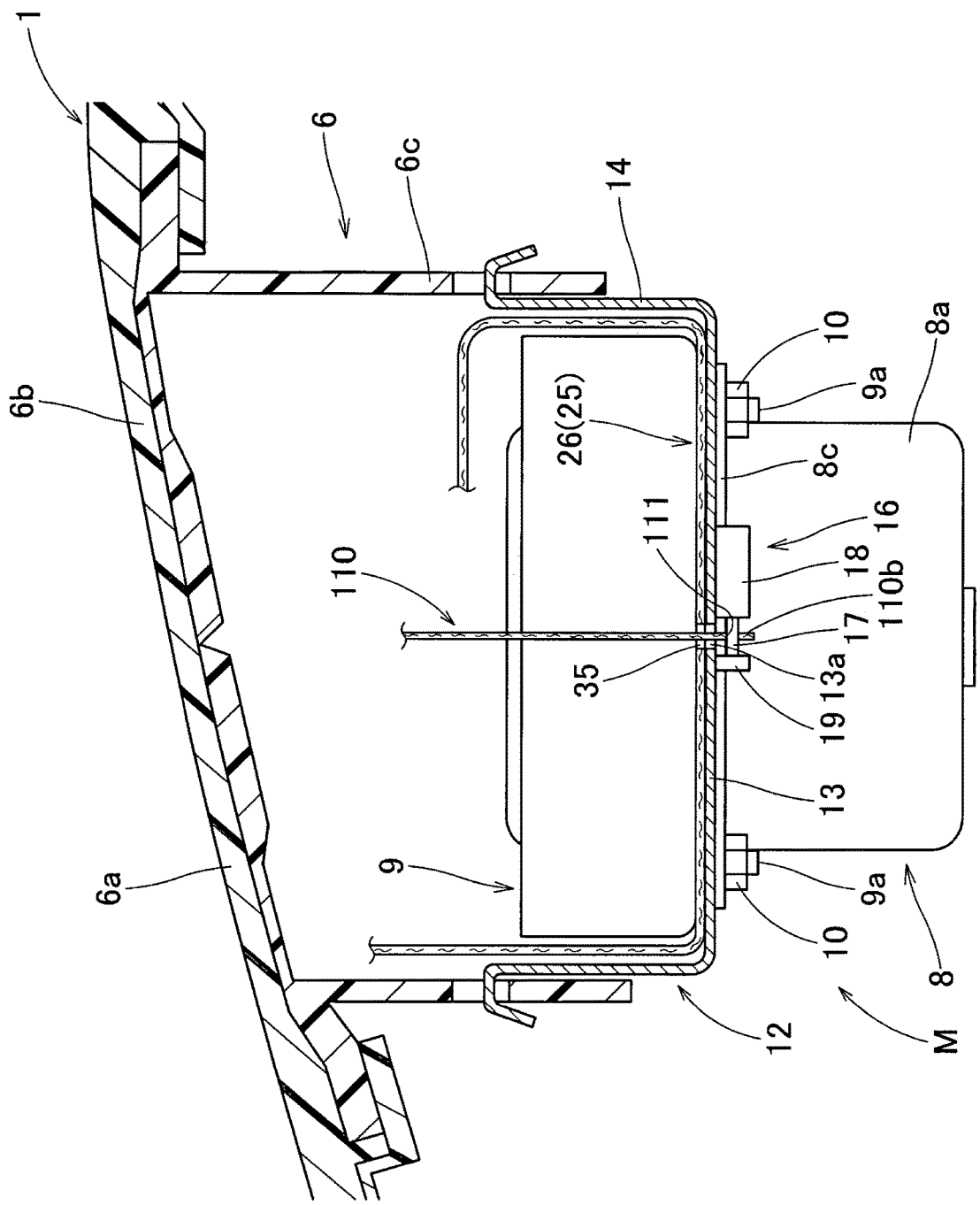
FIG. 2 is a schematic enlarged sectional view of the airbag device of the embodiment in a front-rear direction.
Figure 3:
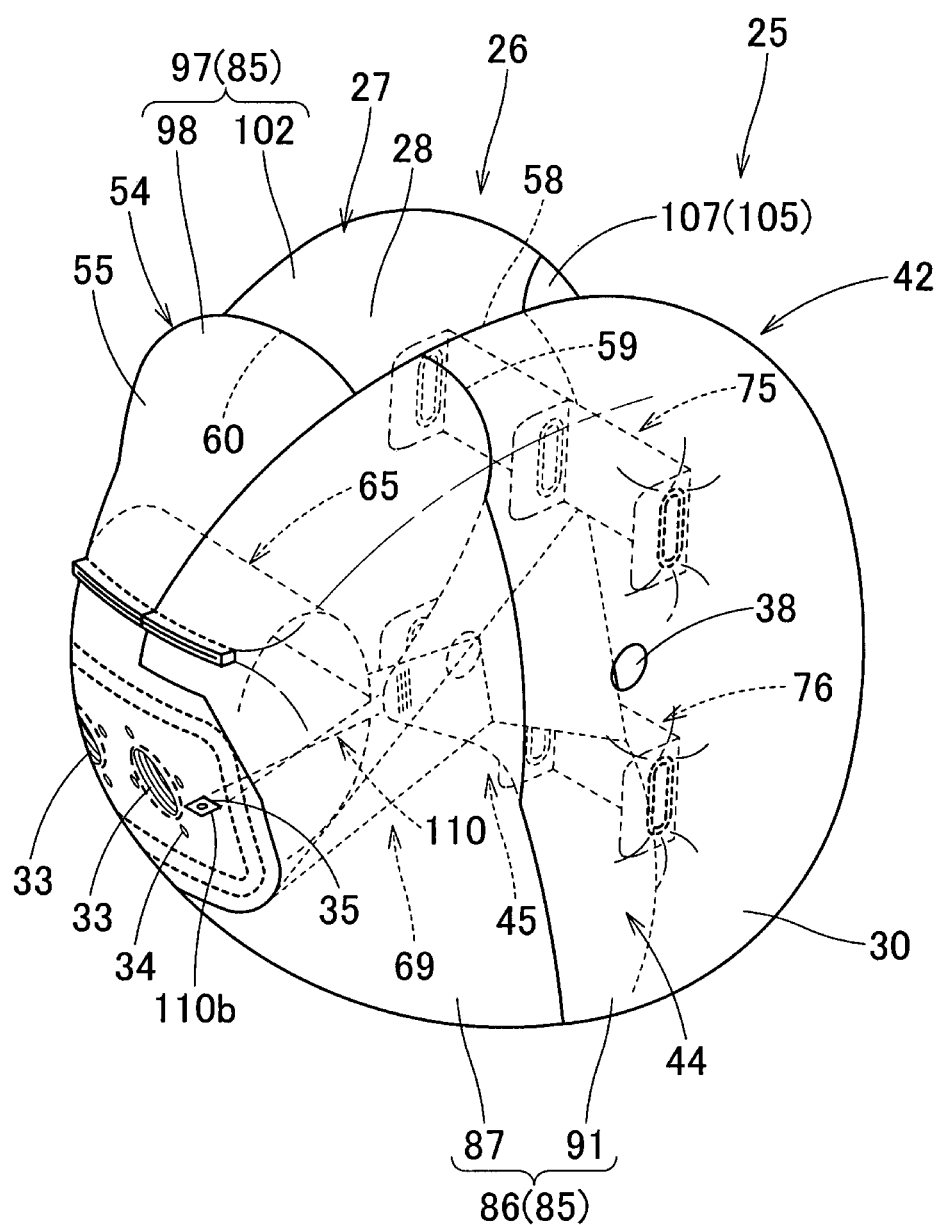
FIG. 3 is a perspective view of a state where an airbag used in the airbag device of the embodiment, in an inflated state is seen from a left front side alone.
Figure 4:
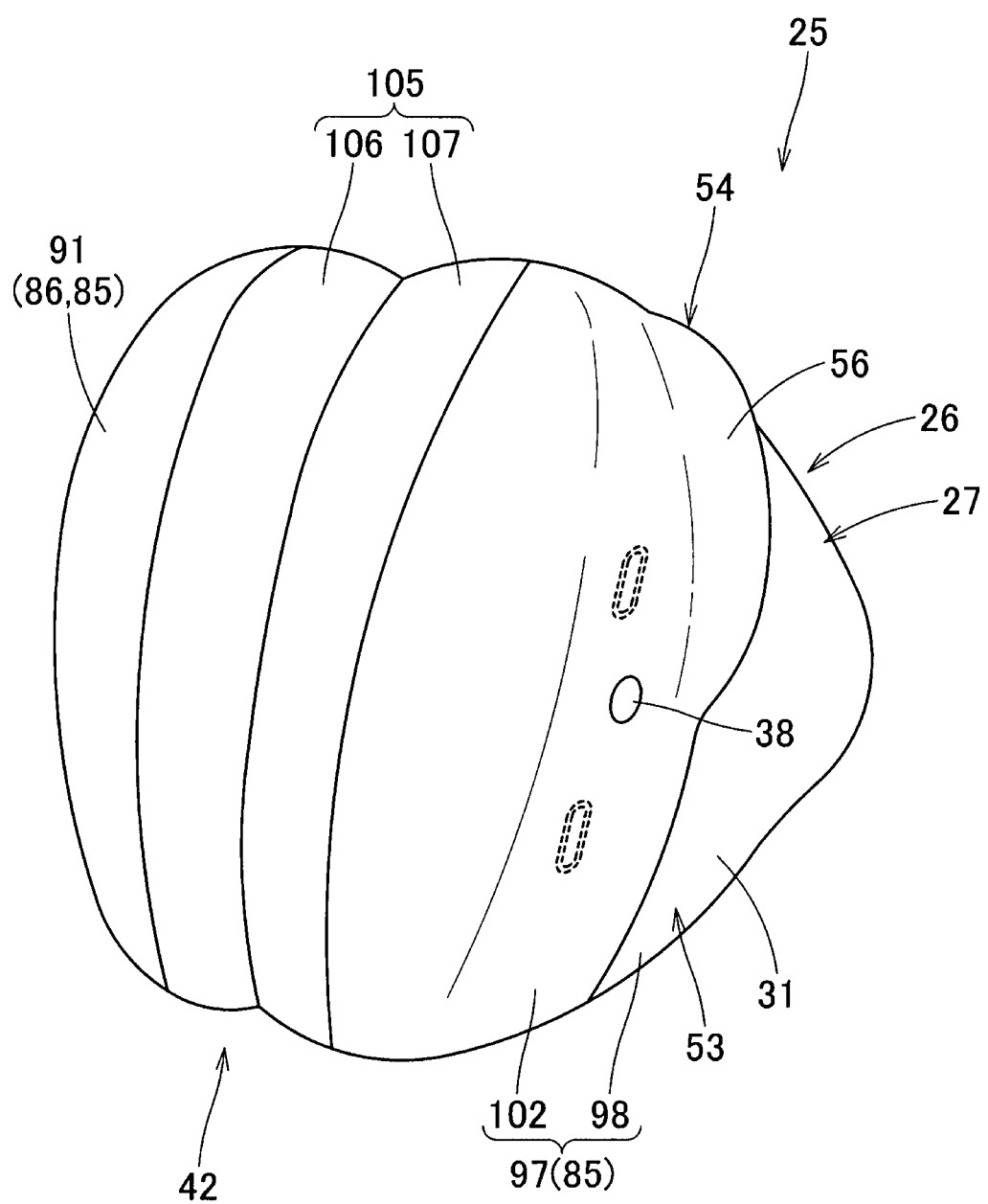
FIG. 4 is a perspective view of a state where the airbag of FIG. 3 is seen from a right rear side.

Hereinafter, an embodiment of the invention will be described based on the drawings. In the embodiment, description is made using a passenger seat airbag device M (hereinafter, abbreviated as an "airbag device") which can protect an occupant MP sitting on a passenger seat PS, as an example. The airbag device M of the embodiment is a top mount type that is disposed in an upper surface 2 of an instrument panel 1 in front of the passenger seat PS in a vehicle, as illustrated in FIGS. 1 and 2. In the embodiment, a front-rear direction, an up-down direction, and a right-left direction are the same as a front-rear direction, an up-down direction, and a right-left direction of the vehicle unless otherwise specified.

As illustrated in FIGS. 1 and 2, the airbag device M includes a folded airbag 25, an inflator 8 which supplies an inflation gas to the airbag 25, a case 12 as a housing part which houses and holds the airbag 25 and the inflator 8, a retainer 9 which attaches the airbag 25 and the inflator 8 to the case 12, an airbag cover 6 which covers the folded airbag 25, and a locking member 16 as an opening/closing control device which controls opening and closing of an exhaust hole 48 formed on the airbag 25. In the embodiment, operations of the inflator 8 and the locking member 16 are controlled by a control device 115 illustrated in FIG. 1.

As illustrated in FIG. 1, the control device 115 receives electric signals from a position detection sensor 116 capable of detecting the physique of the occupant MP sitting on the passenger seat PS and a separation distance between the instrument panel 1 and the occupant MP, a weight detection sensor 117 capable of detecting the weight of the occupant MP, a collision detection sensor 118 capable of detecting an acceleration of the vehicle and the direction of acceleration, and the like so as to cause the inflator 8 to operate and control the operation of the locking member 16 such that the airbag 25 is inflated in a preferred inflation mode.

The airbag cover 6 is integrally formed with the instrument panel 1 made of synthetic resin, and is configured such that two front and rear door portions 6a and 6b are open by being pressed by the airbag 25 at the time of deployment and inflation of the airbag 25. In addition, a connection wall portion 6c connected to the case 12 is formed in the vicinity of the door portions 6a and 6b of the airbag cover 6.

Figure 14:
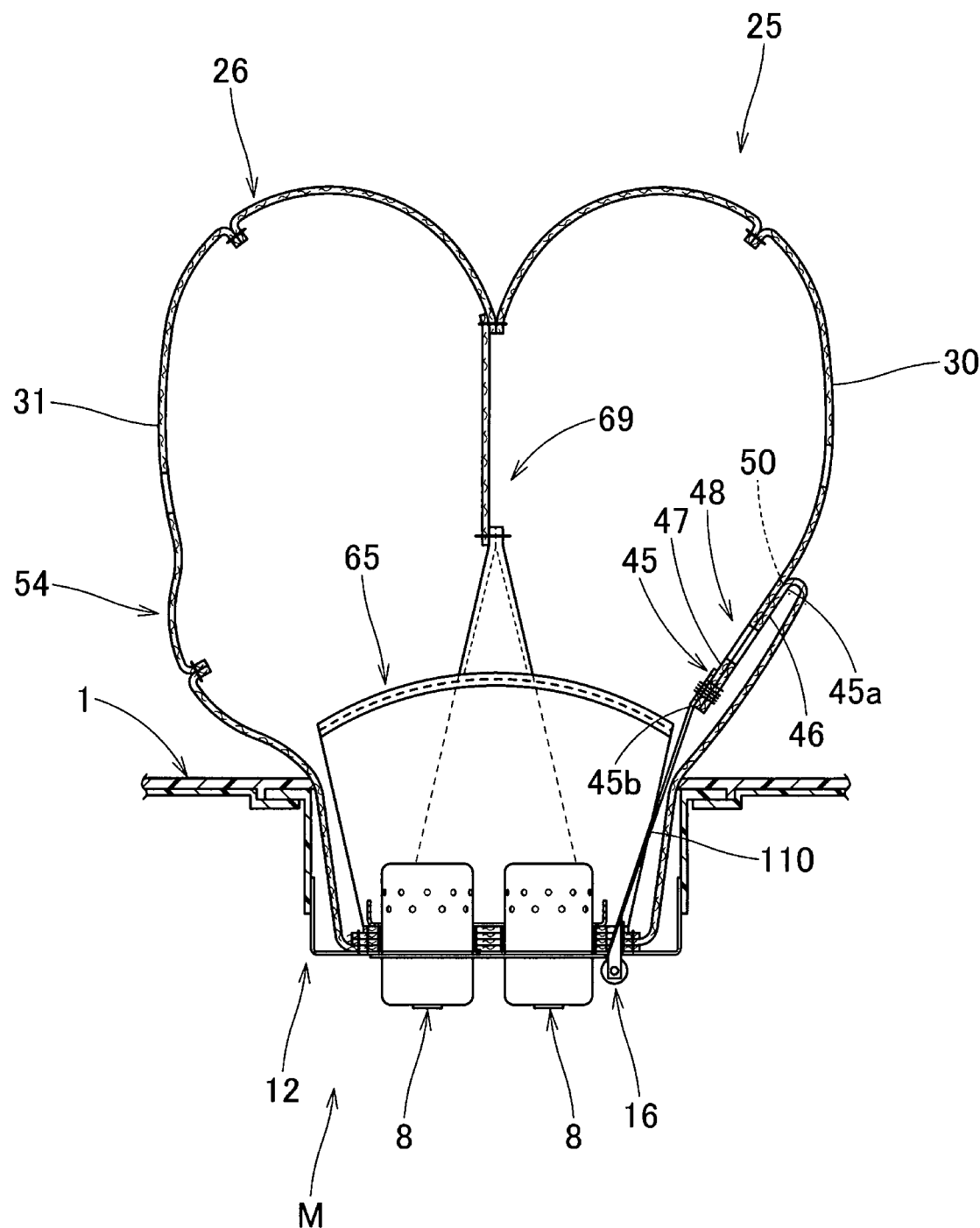
FIG. 14 is a schematic longitudinal sectional view in the front-rear direction illustrating a state where inflation of the airbag in the block mode is completed in the airbag device of the embodiment.
Figure 15:
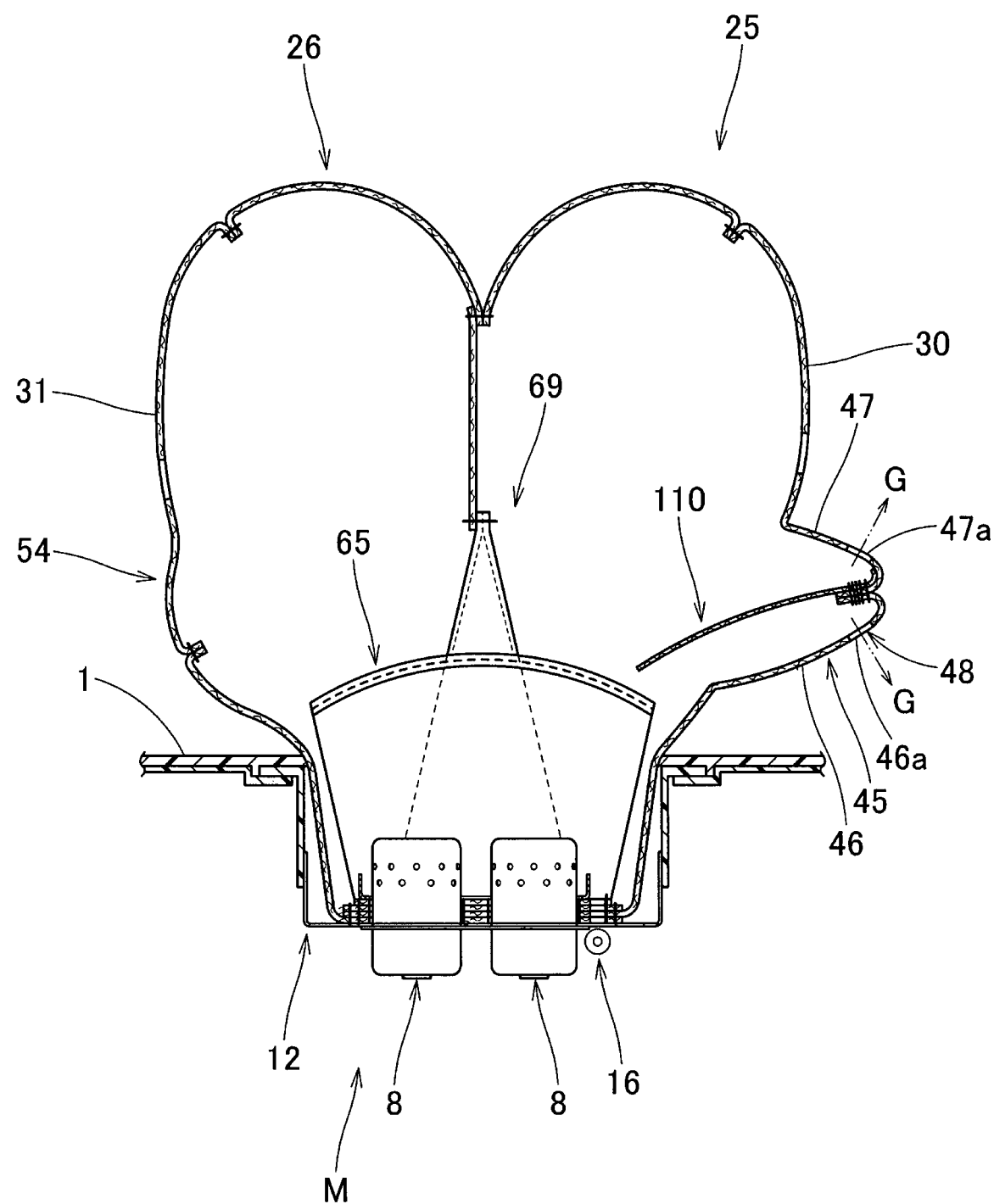
FIG. 15 is a schematic longitudinal sectional view in the front-rear direction illustrating a state where inflation of the airbag in an open mode is completed in the airbag device of the embodiment.

As illustrated in FIGS. 1 and 2, the inflator 8 has an approximately cylindrical body portion 8a provided with a plurality of gas outlets 8b, and a flange portion 8c for attaching the inflator 8 to the case 12. In the airbag device M of the embodiment, two inflators 8 are provided on right and left sides in the right-left direction, as illustrated in FIGS. 14 and 15.

The case 12 as the housing part is formed in an approximately rectangular parallelepiped shape, is made of a metal plate, and has a rectangular opening on an upper end side. As illustrated in FIG. 1, the case 12 includes an approximately rectangular bottom wall portion 13 to which the inflator 8 is attached by being inserted from below, and a peripheral wall portion 14 which extends upwardly from an outer peripheral edge of the bottom wall portion 13 and locks the connection wall portion 6c of the airbag cover 6. In the embodiment, the airbag 25 and the inflator 8 are connected to the bottom wall portion 13 of the case 12 by using each bolt 9a of the retainer 9 disposed in the airbag 25 as an attachment unit in a manner that each bolt 9a penetrates the peripheral edge of an inlet opening 33 of the airbag 25, the bottom wall portion 13 of the case 12, and the flange portion 8c of the inflator 8 to be fastened with a nut 10. Specifically, although the detailed illustration is omitted, the bottom wall portion 13 of the case 12 is configured to be wide in the right-left direction, two insertion holes into which the body portion 8a of the inflator 8 is inserted are provided on right and left sides in the right-left direction, and attachment holes for insertion of each bolt 9a of the retainer 9 are provided in the vicinity of the insertion holes. In the bottom wall portion 13, a through-hole 13a through which a distal end 110b of a connection member 110 which will be described below is inserted is formed on the left side of the left insertion hole for the insertion of the body portion 8a of the inflator 8 (refer to FIG. 2). Further, a bracket, which is not illustrated, connected to a body side of the vehicle is provided on the bottom wall portion 13 of the case 12.

The locking member 16 as the opening/closing control device is provided in the vicinity of the through-hole 13a on a lower portion side of the bottom wall portion 13. The locking member 16 is connected to the distal end 110b of the connection member 110 formed on the airbag 25, and includes a locking pin 17, an actuator 18 which is attached to a lower surface of the bottom wall portion 13 and operates to retract the locking pin 17, and a support bracket 19 capable of supporting a distal end side of the locking pin 17, as illustrated in FIG. 2. The locking pin 17 is inserted into a locking hole 111 formed on the distal end 110b side of the connection member 110 to lock the distal end 110b side of the connection member 110. The actuator 18 is configured to operate to retract the locking pin 17 by receiving an operation signal from the control device 115. When the actuator 18 operates to retract the locking pin 17, the locking pin 17 transitions to a state in which locking is released from a state in which the locking pin 17 locks the distal end 110b side of the connection member 110. A piston cylinder that uses a fluid pressure including a hydraulic pressure, a water pressure, a pneumatic pressure, or a case of generating gas inflating an inflator or the like, a motor that uses these fluid pressures or electricity, an electromagnetic solenoid, a spring that uses urging force during restoration, and the like can be used as the actuator 18 as long as it can move the locking pin 17 according to the electric signals from the control device 115. The support bracket 19 is disposed to extend downwardly from the bottom wall portion 13 on the distal end side of the locking pin 17. During non-operation of the actuator 18, the distal end side of the locking pin 17 is supported by the support bracket 19 such that a part on the distal end 110b side of the connection member 110 is prevented from being falling off from the locking pin 17 at the time of locking.

As illustrated in FIGS. 3 to 8, the airbag 25 includes a bag body 26, a discharge portion 45 including the exhaust hole 48, a dummy inflation portion 54, a flow-regulation cloth 65 disposed inside the bag body 26, tethers 69, 75, and 76 which regulate the shape of the bag body 26 at the time of inflating completion, and the connection member 110 which is disposed inside the bag body 26 by a proximal portion 110a side of the connection member 110 being connected to the discharge portion 45.

Figure 13:
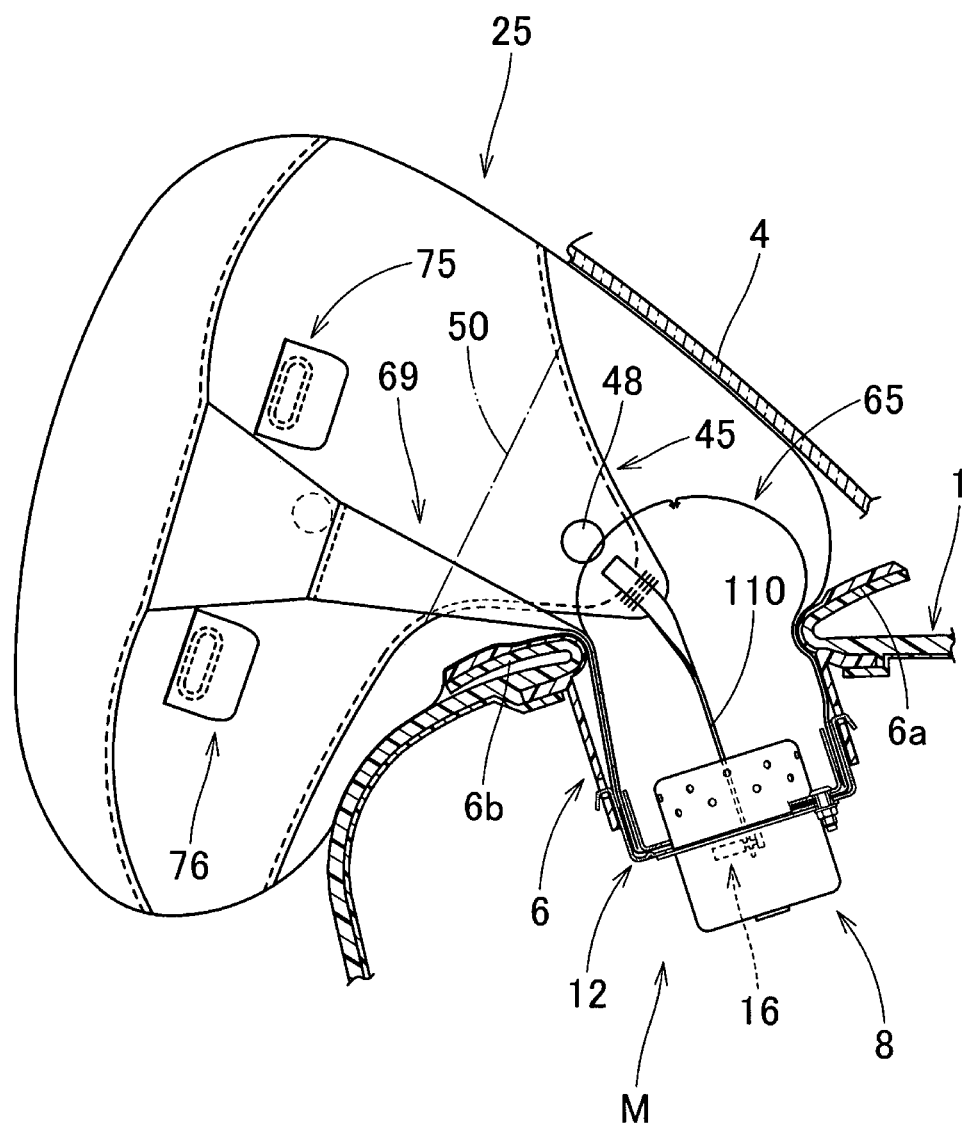
FIG. 13 is a schematic vertical sectional view in the front-rear direction illustrating a state where inflation of the airbag in a block mode is completed in the airbag device of the embodiment.

As illustrated by the two-dot chain line in FIG. 1 and in FIG. 13, the bag body 26 has a configuration in which the bag body is disposed so as to block a space between the upper surface 2 of the instrument panel 1 and a windshield 4 above the instrument panel 1 at the time of inflating completion. Specifically, as illustrated in FIGS. 3 to 7, the shape of the bag body 26 at the time of inflating completion is an approximately quadrangular pyramid shape of which the apex portion is disposed on the front end side. The bag body 26 includes an occupant side wall portion 42 disposed on the occupant MP side at the time of inflating completion, and a peripheral wall portion 27 having a tapered shape which extends forward from the peripheral edge of the occupant side wall portion 42 and converges toward the front end side.

The peripheral wall portion 27 is mainly a part disposed to block a space between the upper surface 2 of the instrument panel 1 and the windshield 4 above the instrument panel 1 at the time of inflating completion of the airbag 25. The peripheral wall portion 27 includes an upper wall portion 28 and a lower wall portion 29 which are disposed on the upper and lower sides along approximately the right-left direction, and a left wall portion 30 and a right wall portion 31 which are disposed on the right and left sides along approximately the front-rear direction. In the vicinity of the front end of the lower wall portion 29 of the peripheral wall portion 27 which is the vicinity of the front end of the bag body 26 at the time of inflating completion, an approximately circular opening is provided at an approximately central position in the right-left direction so as to allow the inflow of the inflation gas into the inside and the peripheral edge of the opening is attached to the bottom wall portion 13 of the case 12 to form the inlet opening 33. In the embodiment, also two inlet openings 33 are provided on right and left sides in the right-left direction to correspond to the inflators 8 (refer to FIG. 3). A plurality of (four in the embodiment) attachment holes 34 are formed on the peripheral edge of each inlet opening 33. The attachment hole 34 is for attaching the peripheral edge of the inlet opening 33 to the bottom wall portion 13 of the case 12 by allowing the insertion of the bolt 9a of the retainer 9. In addition, a slit-shaped insertion hole 35 is formed on the left side of the left inlet opening 33 along approximately the right-left direction. The insertion hole 35 allows the insertion of the distal end 110b of the connection member 110 extending from the discharge portion 45. Further, vent holes 38 and 38 for discharging the excessive inflation gas flowing into the bag body 26 are formed on the left wall portion 30 and the right wall portion 31 of the peripheral wall portion 27 by providing an approximately circular opening. In the embodiment, the vent hole 38 is formed on each of the left wall portion 30 and the right wall portion 31 at a position which is closer to the rear end side than the center in the front-rear direction and is approximately the center in the up-down direction.

The occupant side wall portion 42 is provided on the rear end side of the bag body 26, which becomes the occupant MP side, along the approximately vertical direction so as to face the occupant MP sitting on the passenger seat PS at the time of inflating completion of the bag body 26. The occupant side wall portion 42 is formed to be slightly recessed forward along the up-down direction at the center in the right-left direction at the time of inflating completion of the bag body 26 (refer to FIGS. 4 to 8).

The flow-regulation cloth 65 disposed inside the bag body 26 is for regulating the flow of the inflation gas into the inside of the bag body 26. In the embodiment, the flow-regulation cloth 65 is configured to cover the upper side of the inlet opening 33 and has an approximately cylindrical shape of which the right and left sides are open, so as to cause the inflation gas, which flows into the inside of the bag body 26 from the inlet opening 33, to flow once to both sides in the right-left direction. The flow-regulation cloth 65 is formed of a flow-regulation-cloth raw material 67 illustrated in FIG. 10.

In the embodiment, as tethers for regulating the shape of the bag body 26 at the time of inflating completion, the front-rear tether 69 and right-left tethers 75 and 76 are disposed.

Figure 5:
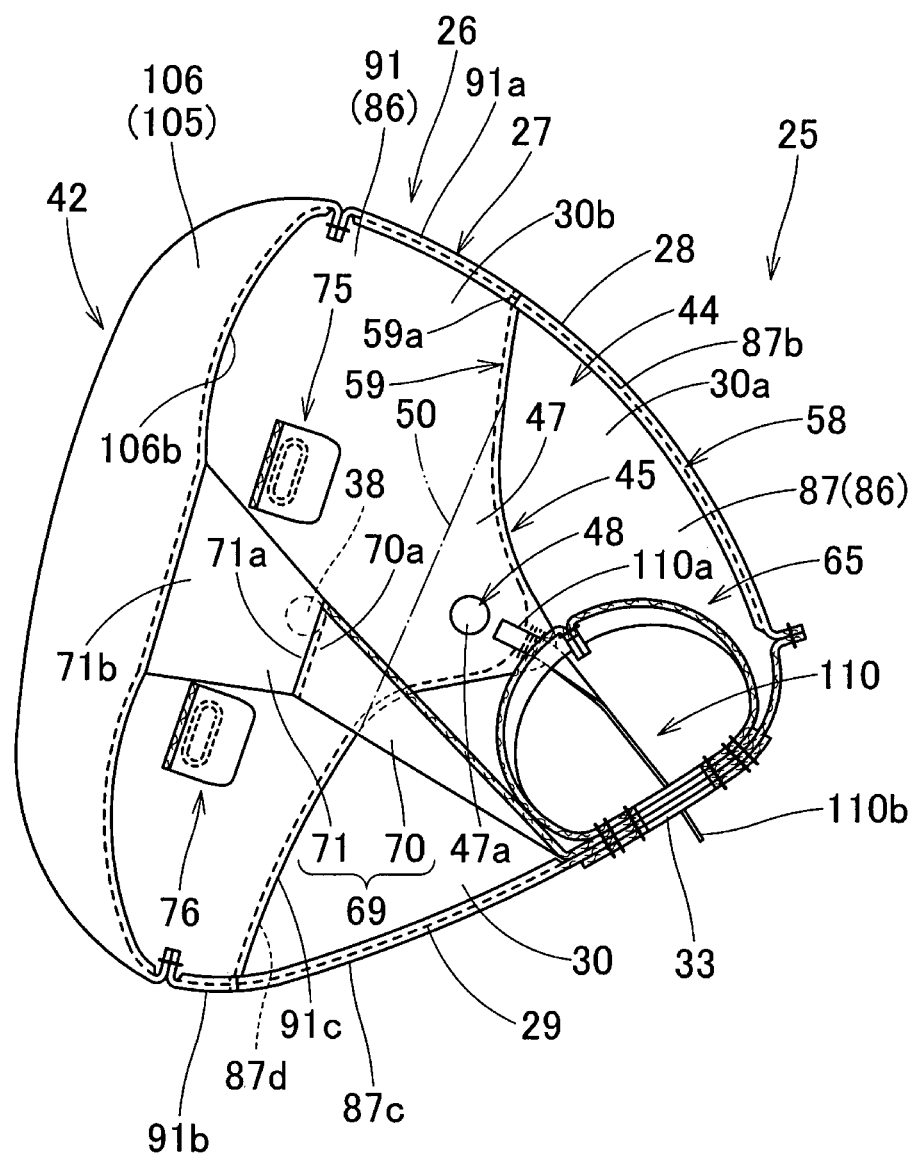
FIG. 5 is a view of a state where a discharge portion side is seen in a schematic vertical section along a vehicle front-rear direction of the airbag of FIG. 3.
Figure 6:
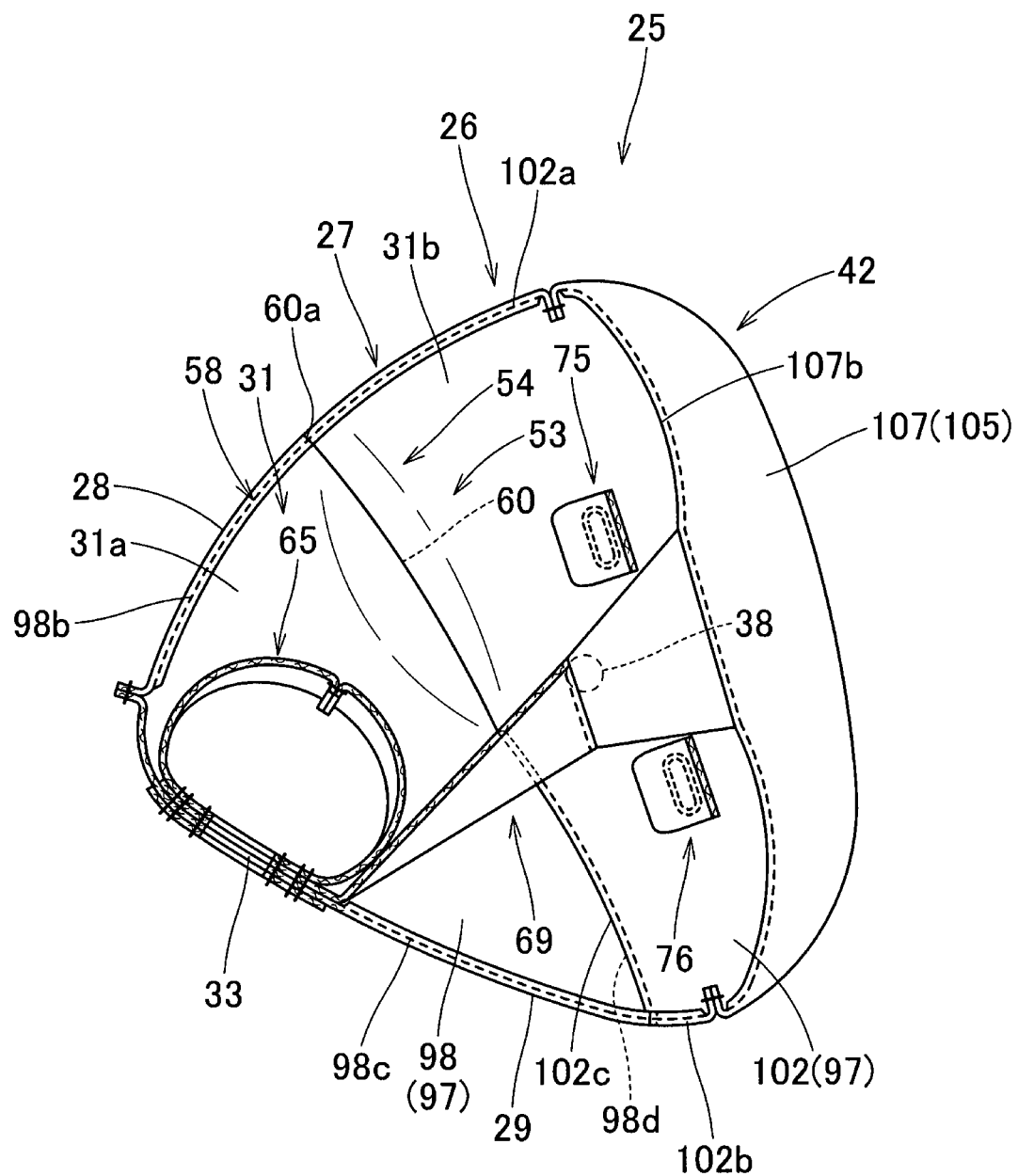
FIG. 6 is a view of a state where a dummy inflation portion side is seen in a schematic vertical section along the vehicle front-rear direction of the airbag of FIG. 3.
Figure 7:
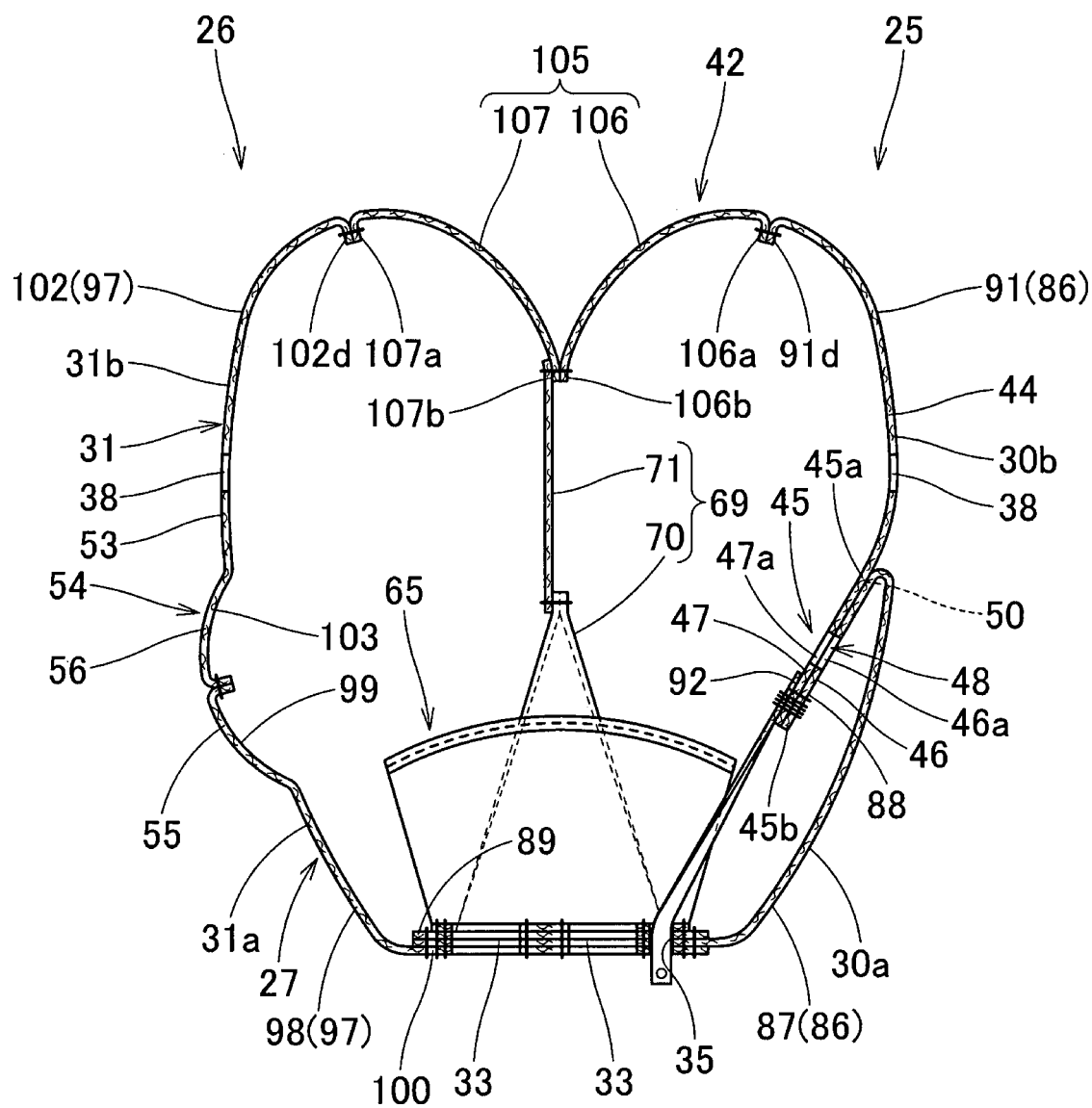
FIG. 7 is a schematic longitudinal section along the vehicle front-rear direction of the airbag of FIG. 3.

The front-rear tether 69 connects approximately the center of the occupant side wall portion 42 in the right-left direction and the front end side of the bag body 26, and is configured to connect a front side part 70 extending from the peripheral edge of the inlet opening 33 and a rear side part 71 extending from the occupant side wall portion 42 side in the embodiment (refer to FIGS. 5 to 7). In the embodiment, the front side part 70 is configured by folding a belt-shaped front side part raw material 73 illustrated in FIG. 10, and is bilaterally symmetrical. Specifically, the outer shape of the front side part 70 at the time of inflating completion of the bag body 26 is a three-dimensional shape approximating an approximately triangular pyramid shape of which the front end side is approximately along the right-left direction and the rear end side is approximately along the up-down direction. The outer shape of the rear side part 71 is an approximately trapezoidal shape of which the width of a front end 71a side connected to the front side part 70 becomes narrow. In the embodiment, a rear edge 71b of the rear side part 71 is sewn to inner edges 106b and 107b of a left side part 106 and a right side part 107 of an occupant side panel portion 105 which will be described below so that the rear side part 71 is connected to the occupant side wall portion 42 at an approximately central position in the up-down direction. The front-rear tether 69 is provided for causing approximately the center of the occupant side wall portion 42 in the right-left direction to be recessed forward at the time of inflating completion of the airbag 25.

In the embodiment, the right-left tethers 75 and 76 are disposed at two positions above and below the front-rear tether 69 as illustrated in FIGS. 5 and 6. Each of the right-left tethers 75 and 76 connects parts in the vicinity of the rear ends of the left wall portion 30 and the right wall portion 31, and is provided along approximately the right-left direction at the time of inflating completion of the bag body 26. That is, the right-left tethers 75 and 76 are provided at positions behind the dummy inflation portion 54 and the discharge portion 45 at the time of inflating completion. The right-left tether 75 is composed of two belt-shaped tether base cloths 78L and 78R, and the right-left tether 76 is composed of two belt-shaped tether base cloths 79L and 79R (refer to FIG. 9). The right-left tethers 75 and 76 are provided in order to regulate the width dimension (separation distance between the left wall portion 30 and the right wall portion 31) of the airbag 25 in the right-left direction at the time of inflating completion.

In the embodiment, the discharge portion 45 is disposed at a position closer to the front side than the vent hole 38 in the left wall portion 30. The discharge portion 45 includes the exhaust hole 48 through which the inflation gas G can be discharged. The discharge portion 45 is integrally formed with the bag body 26, and is configured such that the outer shape in side view in a state where the discharge portion is flatly deployed is an approximately triangular shape which is tapered toward a distal end 45b to which the connection member 110 is connected (refer to FIG. 11). The discharge portion 45 is configured to maintain a state of being drawn into the bag body 26 at the time of inflation of the bag body 26 in a state where connection between the connection member 110 and the locking member 16 is maintained (refer to FIGS. 13 and 14), and to protrude from the bag body 26 by the release of the drawing into the bag body 26 at the time of inflation of the bag body 26 in a state where connection between the connection member 110 and the locking member 16 is released (refer to FIGS. 8 and 15). In the embodiment, the discharge portion 45 is configured such that the outer shape at the time of protruding from the left wall portion 30 is a flat truncated cone shape. Specifically, the discharge portion 45 is configured by combining outer peripheral edges of two side wall portions 46 and 47 which are formed to be continuous from each of a front side part 30a and a rear side part 30b of the left wall portion 30. Two side wall portions 46 and 47 have approximately the same outer shape. Approximately circular openings 46a and 47a are respectively formed on the side wall portions 46 and 47 at a position in the vicinity of the distal end 45b. The openings 46a and 47a constitute the exhaust hole 48, and are formed at approximately the same position in the side wall portions 46 and 47 in the embodiment. In the discharge portion 45 of the embodiment, a sealing part 50 where the side wall portions 46 and 47 are pressed against each other is formed in the vicinity of a part (a boundary part with respect to the left wall portion 30) on the proximal portion 45a side so as to be approximately orthogonal to the connection member 110 at the time when the discharge portion is being drawn into the bag body 26. The openings 46a and 47a (exhaust hole 48) are formed at a region closer to the distal end 45b side than the sealing part 50 (refer to FIG. 13).

The connection member 110 connecting the discharge portion 45 and the locking member 16 is a member separated from the bag body 26, and is formed of a belt-shaped cloth material having flexibility, and the proximal portion 110a side of the connection member 110 is sewn (bound) to the distal end 45b side of the discharge portion 45 (refer to FIGS. 5 and 7). The locking hole 111 into which the locking pin 17 of the locking member 16 is inserted is formed on the distal end 110b side of the connection member 110. The length dimension of the connection member 110 is set to a dimension which does not hinder the inflation of the airbag 25 even when the airbag 25 is inflated in the block mode in which locking with the locking pin 17 is maintained by inserting the locking pin 17 into the locking hole 111 and the discharge portion 45 is drawn into the bag body 26. In the airbag device M of the embodiment, in a case where the airbag 25 is inflated in the block mode where locking between the connection member 110 and the locking member 16 is maintained, the airbag 25 is inflated in a state where the discharge portion 45 is drawn into the bag body 26 by the connection member 110. The side wall portions 46 and 47 around the exhaust hole 48 receive the internal pressure of the inflation gas flowing into the bag body 26 so as to be pressed against each other, and therefore the opening of the exhaust hole 48 is suppressed (refer to FIGS. 13 and 14). In addition, in a case where the airbag 25 is inflated in an open mode where locking between the connection member 110 and the locking member 16 is released, the drawing into the bag body 26 is released so that the discharge portion 45 protrudes from the bag body 26 so as to be inverted with respect to the bag body 26, and thereby the exhaust hole 48 is open (refer to FIG. 15).

Figure 12:
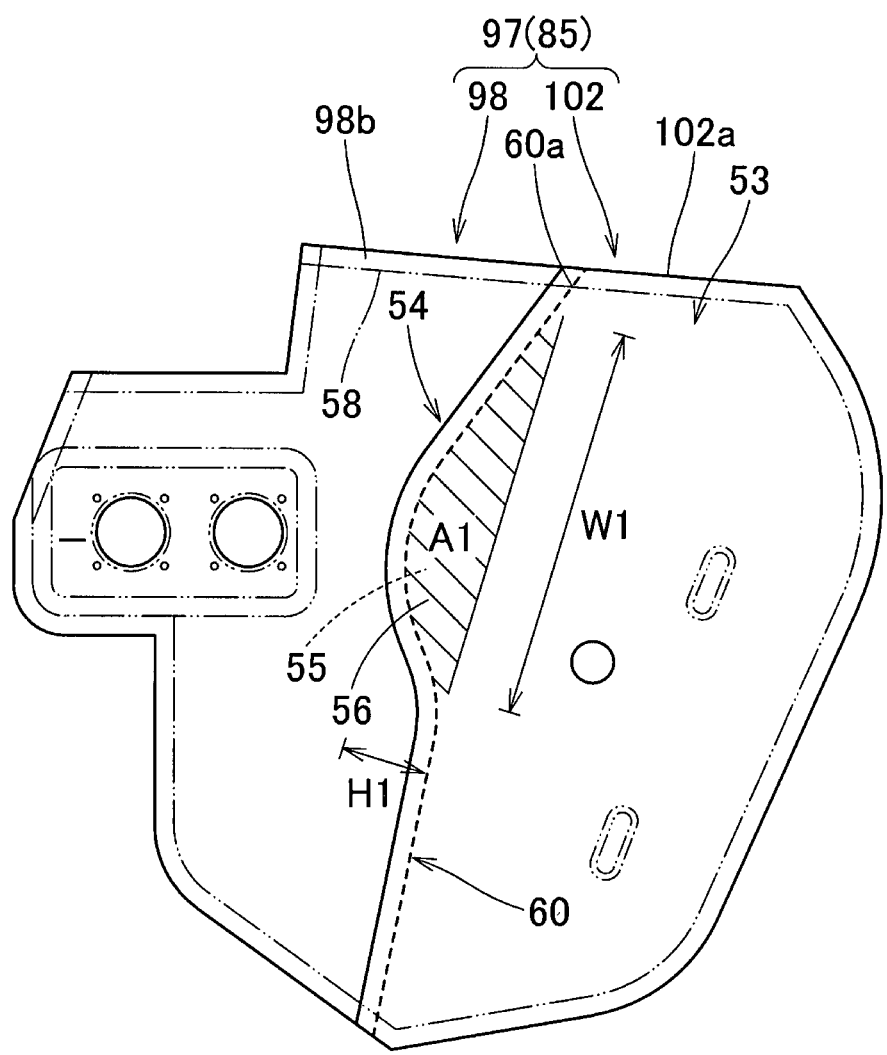
FIG. 12 is a plan view illustrating a state where a right side panel portion formed by sewing a front side part and a rear side part is flatly deployed in the base cloth constituting the airbag.

The dummy inflation portion 54 is disposed at a position that is approximately symmetrical to the discharge portion 45 with a part where the inlet opening 33 is provided as the center. In the embodiment, the dummy inflation portion 54 is disposed at a position closer to the front side than the vent hole 38, in the right wall portion 31 (refer to FIGS. 4 and 6). Specifically, the dummy inflation portion 54 is disposed at a position closer to the front side than the discharge portion 45 in side view where the bag body 26 of which inflation is completed is seen from the right-left direction, and is inflated to partially protrude from the bag body 26 at the time of inflation of the bag body 26. The dummy inflation portion 54 is integrally formed with the bag body 26, and is configured such that the outer shape in side view in a state where the dummy inflation portion is flatly deployed is an approximately triangular shape which is flatter than the discharge portion 45 (refer to FIG. 12). Specifically, the dummy inflation portion 54 is provided to partially protrude from the bag body 26 over a region on the upper side of the right wall portion 31 from a region on the right side of a central side binding part 58, which will be described below, of the upper wall portion 28 at the time of inflating completion of the bag body 26 (refer to FIGS. 4 and 8). The dummy inflation portion 54 is configured such that the outer shape at the time of inflating completion of the bag body 26 is an approximately semi-elliptical shape. Specifically, the dummy inflation portion 54 is configured by combining outer peripheral edges of two side wall portions 55 and 56 which are formed to be continuous from each of a front side part 31a and a rear side part 31b of the right wall portion 31. Two side wall portions 55 and 56 have approximately the same outer shape.

In addition, the volume of the dummy inflation portion 54 at the time of inflating completion is set to be smaller than the volume of the discharge portion 45 in a state where the exhaust hole 48 is open at the time of inflation. Specifically, an area A1 of the side wall portions 55 and 56 constituting the dummy inflation portion 54 in a state where the side wall portions 55 and 56 are flatly deployed (refer to FIG. 12) is set to be smaller than an area A2 of the side wall portions 46 and 47 constituting the discharge portion 45 in a state where the side wall portions 46 and 47 are flatly deployed (refer to FIG. 11). Further, a width dimension W1 of the proximal portion side of the side wall portions 55 and 56 constituting the dummy inflation portion 54 in a state where the side wall portions 55 and 56 are flatly deployed is set to be larger than a width dimension W2 of the proximal portion side of the side wall portions 46 and 47 constituting the discharge portion 45 in a state where the side wall portions 46 and 47 are flatly deployed, and a height dimension H1 of the side wall portions 55 and 56 constituting the dummy inflation portion 54 is set to be smaller than a height dimension H2 of the side wall portions 46 and 47 constituting the discharge portion 45 (refer to FIGS. 11 and 12). Specifically, in the embodiment, the ratio W2/W1 of the width dimensions W1 and W2 of the proximal portion side is set to be about 5/6, and a ratio H1/H2 of the height dimensions H1 and H2 is set to be about 1/2. The area A1 of the side wall portions 55 and 56 constituting the dummy inflation portion 54 is set to be about 3/5 of the area A2 of the side wall portions 46 and 47 constituting the discharge portion 45. That is, the dummy inflation portion 54 is configured to have a flat shape at the time of inflating completion by setting a protrusion amount from the bag body 26 to be smaller than that of the discharge portion 45 and setting a volume V1 of the dummy inflation portion 54 to be smaller than a volume V2 of the discharge portion 45. Specifically, in the embodiment, the volume of the bag body 26 is set to be about 130 L, the volume V1 of the dummy inflation portion 54 is set to be about 1 L, and the volume V2 of the discharge portion 45 is set to be about 2 L. It is preferable that a volume ratio V1/V2 of the dummy inflation portion 54 and the discharge portion 45 is set to be within a range of about 1/3 to 4/5.

Figure 8:
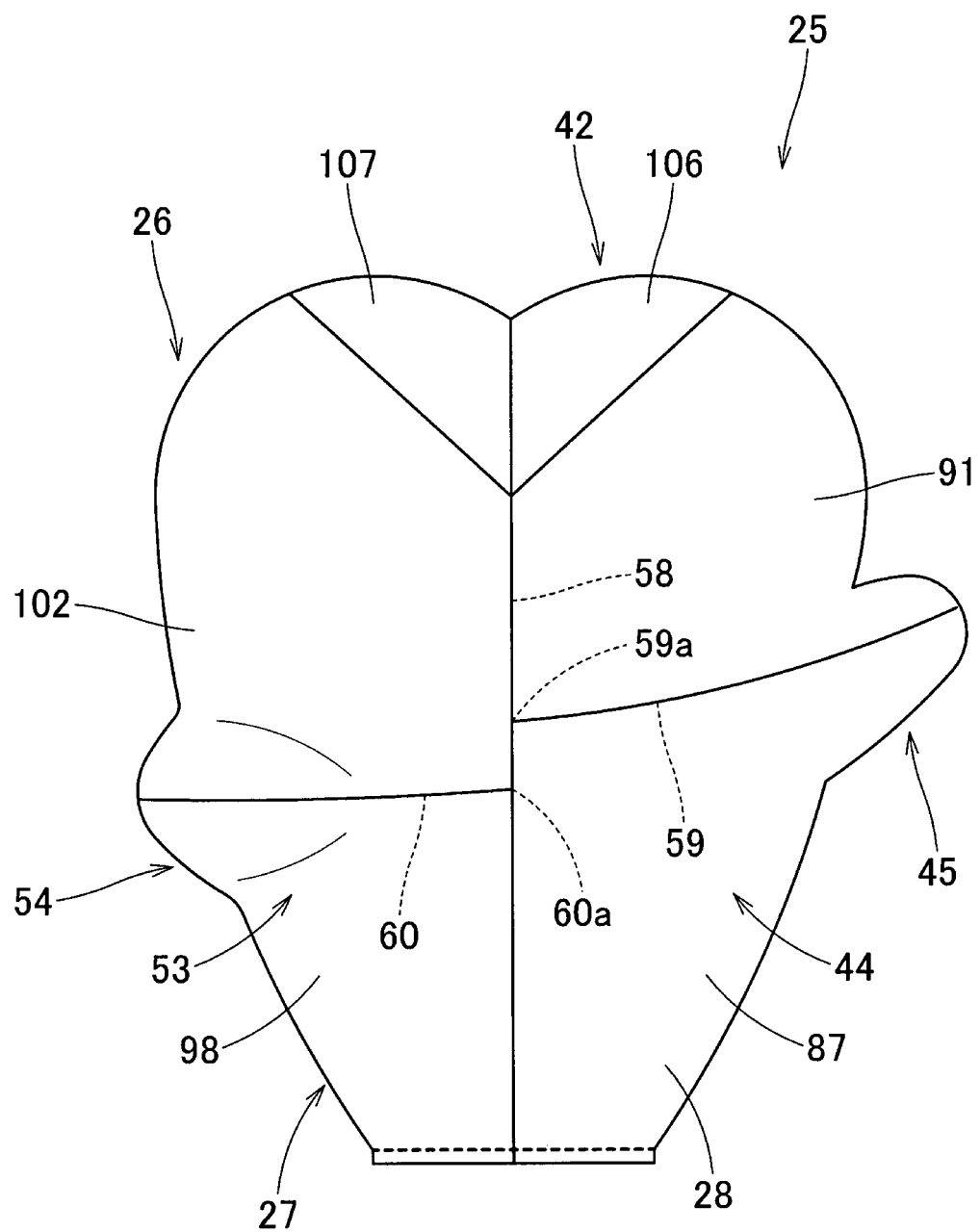
FIG. 8 is a schematic plan view of a state where the discharge portion is also inflated in the airbag of FIG. 3.

In the airbag 25 of the embodiment, a region of the peripheral wall portion 27 of the bag body 26 is divided into the discharge portion 45 side and the dummy inflation portion 54 side, that is, divided into approximately two in the right-left direction as described below, and the divided two regions are respectively composed of a left side panel portion 86 and a right side panel portion 97 (refer to FIG. 9). The left side panel portion 86 constitutes a discharge-portion-side part 44 including the discharge portion 45, in the peripheral wall portion 27. The right side panel portion 97 constitutes a dummy-inflation-portion-side part 53 including the dummy inflation portion 54, in the peripheral wall portion 27. The region of each of the left side panel portion 86 and the right side panel portion 97 is divided into two in the front-rear direction. In the airbag 25 of the embodiment, the central side binding part 58 which is formed by binding upper edges 87b and 91a of the left side panel portion 86 with upper edges 98b and 102a of the right side panel portion 97 is formed in the entire front-rear region along the front-rear direction, on the upper wall portion 28 of the peripheral wall portion 27 (refer to FIGS. 5, 6, 8, 11, and 12). A left side binding part 59 (discharge-portion-side binding part) which is formed by binding a rear edge 87d of the front side part 87 with a front edge 91c of the rear side part 91 in the left side panel portion 86 is formed on the left side of the central side binding part 58 so as to be approximately orthogonal to the central side binding part 58 (refer to FIG. 8). The left side binding part 59 is configured such that an edge 59a approaches the central side binding part 58. In the embodiment, the edge 59a of the left side binding part 59 is bound to the central side binding part 58 as illustrated in FIG. 8. A right side binding part 60 (dummy-inflation-portion-side binding part) which is formed by binding a rear edge 98d of the front side part 98 with a front edge 102c of the rear side part 102 in the right side panel portion 97 is formed on the right side of the central side binding part 58, at a position closer to the front side than the left side binding part 59 so as to be approximately orthogonal to the central side binding part 58 (refer to FIG. 8). The right side binding part 60 is formed such that an edge 60a approaches the central side binding part 58, specifically, the edge 60a is bound to the central side binding part 58 (refer to FIG. 8). Specifically, in the embodiment, the right side binding part 60 is disposed such that the edge 60a is bound to the central side binding part at approximately the center in the front-rear direction. That is, the left side binding part 59 and the right side binding part 60 are disposed such that the edges 59a and 60a (binding part) are shifted in the front-rear direction when the airbag 25 at the time of inflating completion is viewed from above.

Figure 10:
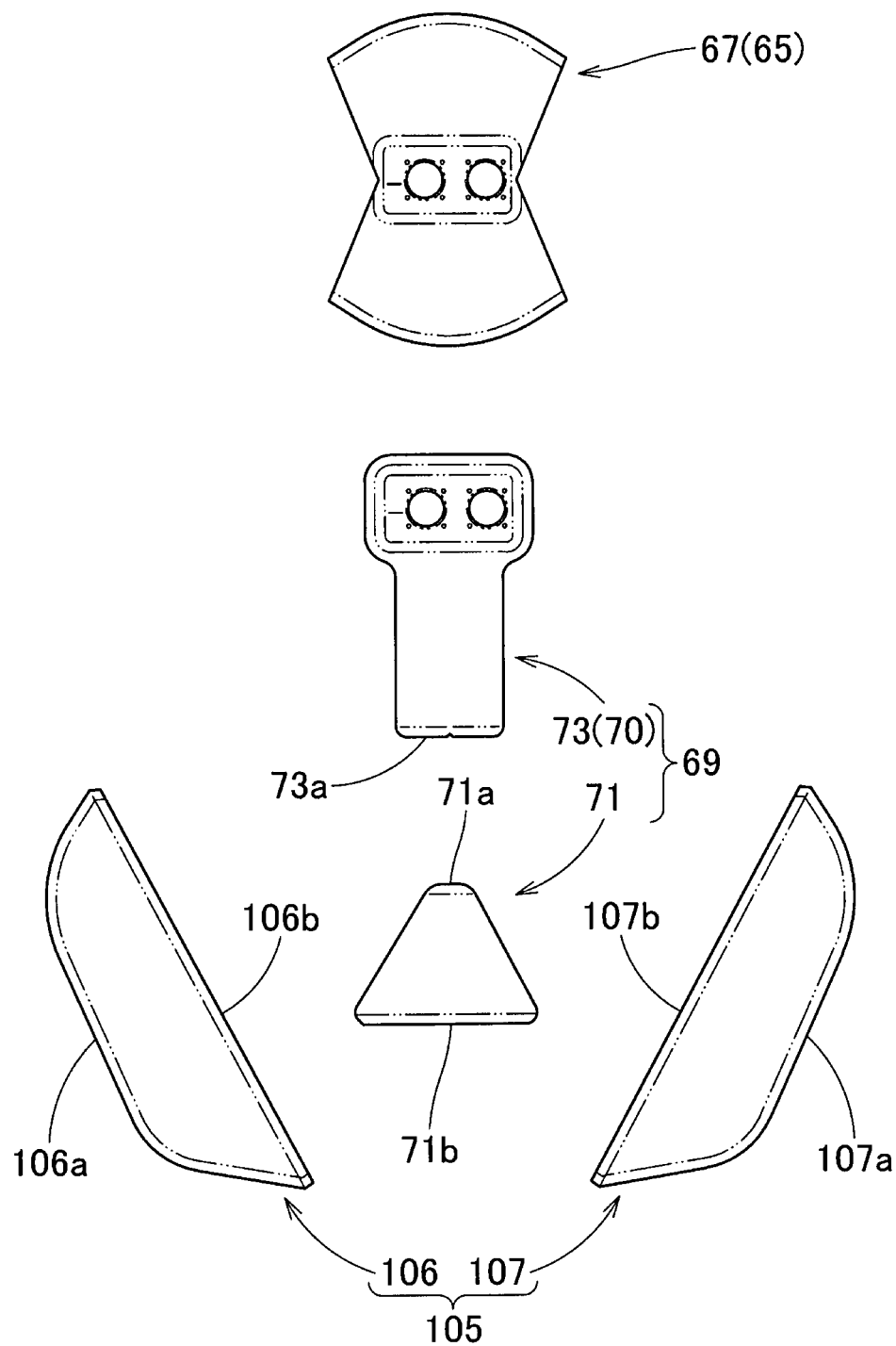

The bag body 26, the discharge portion 45, and the dummy inflation portion 54 are configured in an integral bag shape by binding peripheral edges of base cloths having a predetermined shape. In the embodiment, the bag body 26, the discharge portion 45, and the dummy inflation portion 54 are composed of a peripheral wall panel portion 85 mainly constituting the peripheral wall portion 27 side, and an occupant side panel portion 105 mainly constituting the occupant side wall portion 42 side as illustrated in FIGS. 9 and 10. The peripheral wall panel portion 85 includes the left side panel portion 86 constituting the left side region (region on the discharge portion 45 side), and the right side panel portion 97 constituting the right side region (region on the dummy inflation portion 54 side) so as to divide the peripheral wall portion 27 into approximately two in the right-left direction. The left side panel portion 86 constitutes the discharge-portion-side part 44 in the peripheral wall portion 27 including the discharge portion 45, and constitutes, specifically, a part from a left half region of the upper wall portion 28 to a left half region of the lower wall portion 29 via the left wall portion 30, in the peripheral wall portion 27. The right side panel portion 97 constitutes the dummy-inflation-portion-side part 53 in the peripheral wall portion 27 including the dummy inflation portion 54, and constitutes, specifically, a part from a right half region of the upper wall portion 28 to a right half region of the lower wall portion 29 via the right wall portion 31, in the peripheral wall portion 27. The left side panel portion 86 and the right side panel portion 97 respectively include protrusion portions 89 and 100 constituting a peripheral edge region of the inlet opening 33.

As illustrated in FIG. 9, the left side panel portion 86 is divided into two (the inlet opening 33 side and the occupant side wall portion 42 side) in the front-rear direction. In the embodiment, the front side part 87 and the rear side part 91 constituting the left side panel portion 86 constitute a pair of discharge-portion-side part constituting portions constituting the discharge-portion-side part 44 including the discharge portion 45 in the peripheral wall portion 27.

The front side part 87 includes the protrusion portion 89, a discharge-portion forming part 88 constituting the side wall portion 46 of the discharge portion 45 partially protrudes on the rear edge 87d side. The outer shape of the discharge-portion forming part 88 is an approximately triangular shape gently continuous from the rear edge 87d of the front side part 87, and the discharge-portion forming part 88 includes an approximately circular opening 88a forming the exhaust hole 48. In the rear side part 91, a discharge-portion forming part 92 constituting the side wall portion 47 of the discharge portion 45 partially protrudes on the front edge 91c side. An approximately circular opening 92a forming the exhaust hole 48 is formed in the discharge-portion forming part 92. In a state where the outer peripheral surface of a region on the front edge 91c side of the rear side part 91 and the outer peripheral surface of a region on the rear edge 87d side of the front side part 87 are overlapped to be in contact with each other, the outer shape of the region on the front edge 91c side, including the discharge-portion forming part 92 is configured to be the same as the outer shape of the region on the rear edge 87d side.

As illustrated in FIG. 9, the right side panel portion 97 is divided into two (the inlet opening 33 side and the occupant side wall portion 42 side) in the front-rear direction. In the embodiment, the front side part 98 and the rear side part 102 constituting the right side panel portion 97 constitute a pair of dummy-inflation-portion-side part constituting portions constituting the dummy-inflation-portion-side part 53 including the dummy inflation portion 54 in the peripheral wall portion 27.

The front side part 98 includes the protrusion portion 100, and a dummy-inflation-portion forming part 99 constituting the side wall portion 55 of the dummy inflation portion 54 partially protrudes on the rear edge 98d side. The outer shape of the dummy-inflation-portion forming part 99 is an approximately flat triangular shape which is gently continuous from the rear edge 98d of the front side part 98 and of which the distal end side is curved greatly. In the rear side part 102, a dummy-inflation-portion forming part 103 constituting the side wall portion 56 of the dummy inflation portion 54 partially protrudes on the front edge 102c side. In a state where the outer peripheral surface of a region on the front edge 102c side of the rear side part 102 and the outer peripheral surface of a region on the rear edge 98d side of the front side part 98 are overlapped to be in contact with each other, the outer shape of the region on the front edge 102c side, including the dummy-inflation-portion forming part 103, is configured to be the same as the outer shape of the region on the rear edge 98d side.

Figure 11:
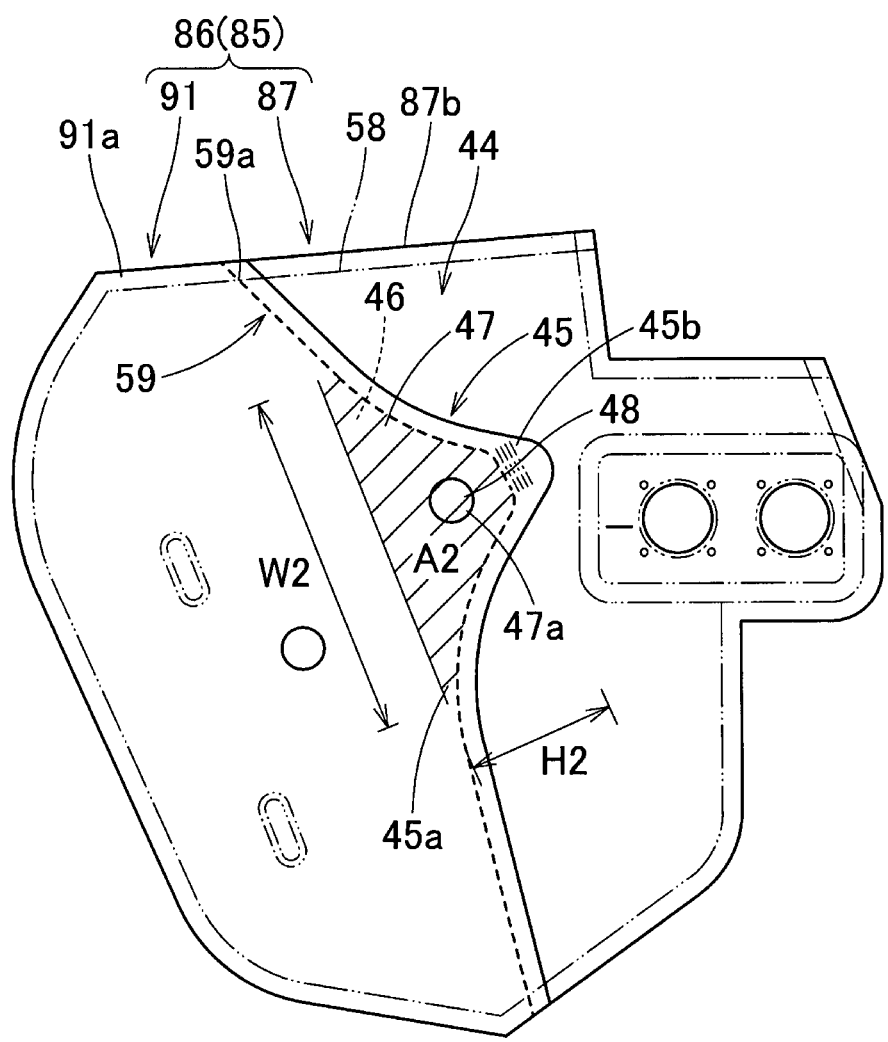
FIG. 11 is a plan view illustrating a state where a left side panel portion formed by sewing a front side part and a rear side part is flatly deployed in the base cloth constituting the airbag.

In the airbag 25 of the embodiment, in the left side panel portion 86, the rear edge 87d of the front side part 87 and the front edge 91c of the rear side part 91 are continuously bound (sewn) to each other in a state of being overlapped with each other including peripheral edges 88b and 92b of the discharge-portion forming parts 88 and 92 so as to form the left side binding part 59, and thereby the discharge-portion-side part 44 including the discharge portion 45 is formed (refer to FIG. 11). Similarly, in the right side panel portion 97, the rear edge 98d of the front side part 98 and the front edge 102c of the rear side part 102 are continuously bound (sewn) to each other in a state of being overlapped with each other including peripheral edges 99a and 103a of the dummy-inflation-portion forming parts 99 and 103 so as to form the right side binding part 60, and thereby the dummy-inflation-portion-side part 53 including the dummy inflation portion 54 is formed (refer to FIG. 12). The left side panel portion 86 and the right side panel portion 97 have the same outer shape in a state where the front side parts 87 and 98 and the rear side parts 91 and 102 are flatly deployed to be open (refer to FIGS. 11 and 12).

The occupant side panel portion 105 includes the left side part 106 constituting the left side region and the right side part 107 constituting the right side region so as to mainly divide the occupant side wall portion 42 into approximately two in the right-left direction. The left side part 106 and the right side part 107 are approximately bilaterally symmetrical as illustrated in FIG. 10.

In the embodiment, the left side panel portion 86 (front side part 87, rear side part 91), the right side panel portion 97 (front side part 98, rear side part 102), the occupant side panel portion 105 (left side part 106, right side part 107) which constitute the bag body 26, the discharge portion 45, and the dummy inflation portion 54; the flow-regulation-cloth raw material 67 constituting the flow-regulation cloth 65; the front side part raw material 73 and the rear side part 71 which constitute the front-rear tether 69; and the tether base cloths 78L, 78R, 79L, and 79R which constitute the right-left tethers 75 and 76 are formed of a woven fabric having flexibility, and made of polyester yarn, polyamide yarn, or the like.

As illustrated in FIGS. 5 to 7, 9, and 10, the bag body 26, the discharge portion 45, and the dummy inflation portion 54 of the embodiment are formed in a bag shape by sewing (binding) corresponding edge portions of the left side panel portion 86 (front side part 87, rear side part 91), the right side panel portion 97 (front side part 98, rear side part 102), the occupant side panel portion 105 (left side part 106, right side part 107) by using suture thread. In the front side part 87 and the rear side part 91 of the left side panel portion 86, the rear edge 87d of the front side part 87 and the front edge 91c of the rear side part 91 are bound to each other including the peripheral edges 88b and 92b of the discharge-portion forming parts 88 and 92 so as form the left side binding part 59 as described above. The proximal portion 110a side of the connection member 110 is bound (sewn) to the distal end side of a part constituting the discharge portion 45 in advance after the left side binding part 59 is formed. In the front side part 98 and the rear side part 102 of the right side panel portion 97, the rear edge 98d of the front side part 98 and the front edge 102c of the rear side part 102 are bound to each other including the peripheral edges 99a and 103a of the dummy-inflation-portion forming parts 99 and 103 so as to form the right side binding part 60 as described above. The protrusion portions 89 and 100 of the left side panel portion 86 and the right side panel portion 97 are overlapped with each other to be bound at the peripheral edge of the inlet opening 33 and an approximately rectangular area on the outer peripheral side of the protrusion portion. The upper edges 87b and 91a of the front side part 87 and the rear side part 91 of the left side panel portion 86 are bound to the upper edges 98b and 102a of the front side part 98 and the rear side part 102 of the right side panel portion 97 to form the central side binding part 58. The lower edges 87c and 91b of the front side part 87 and the rear side part 91 of the left side panel portion 86 are bound to the lower edges 98c and 102b of the front side part 98 and the rear side part 102 of the right side panel portion 97. A front upper edge 87a of the front side part 87 of the left side panel portion 86 is folded in half to be bound to each other. Similarly, a front upper edge 98a of the front side part 98 of the right side panel portion 97 is folded in half to be bound to each other. Inner edges 106b and 107b of the left side part 106 and the right side part 107 of the occupant side panel portion 105 are bound to each other. A rear edge 91d of the rear side part 91 of the left side panel portion 86 is bound to an outer edge 106a of the left side part 106 of the occupant side panel portion 105. A rear edge 102d of the rear side part 102 of the right side panel portion 97 is bound to an outer edge 107a of the right side part 107 of the occupant side panel portion 105.

Next, mounting the airbag device M of the embodiment into a vehicle will be described. First, the airbag 25 is folded so as to be housed in the case 12 in a state where the retainer 9 is housed therein, and the folded airbag 25 is wrapped in a breakable wrapping sheet, which is not illustrated, so as not to collapse. At this time, the distal end 110b side of the connection member 110 extending from the discharge portion 45 is made protrude through the insertion hole 35 formed in the bag body 26. Then, the folded airbag 25 is housed in the case 12 to which the locking member 16 is attached in advance, by allowing the bolt 9a to protrude from the bottom wall portion 13. The locking pin 17 of the locking member 16 is inserted into the locking hole 111 of the connection member 110 protruding through the through-hole 13a formed on the bottom wall portion 13 and the distal end of the locking pin 17 is supported by the support bracket 19 so that the distal end 110b side of the connection member 110 is locked by the locking member 16. Next, the body portion 8a of the inflator 8 is inserted into the case 12 from below the bottom wall portion 13, and the bolt 9a of the retainer 9, which protrudes downwardly from the bottom wall portion 13, is inserted into the flange portion 8c of the inflator 8. Thereafter, if the nut 10 is fastened to the bolt 9a which protrudes through the flange portion 8c of the inflator 8, the folded airbag 25 and the inflator 8 can be attached to the case 12.

Thereafter, if the peripheral wall portion 14 of the case 12 is locked to the connection wall portion 6c of the airbag cover 6 in the instrument panel 1 mounted in the vehicle, a bracket (not illustrated) provided in the case 12 is fixed to the vehicle body side, and the inflator 8 and the locking member 16 are electrically connected to the control device 115, the passenger seat airbag device M can be mounted in the vehicle.

After the passenger seat airbag device M is mounted in the vehicle, if a frontal impact of the vehicle is detected, the control device 115 outputs an operation signal to the inflator 8. The inflator 8 discharges an inflation gas from the gas outlet 8b, the airbag 25 is inflated by the inflation gas flowing to the inside of the airbag, and the door portions 6a and 6b of the airbag cover 6 are pushed to be open. Then, the airbag 25 protrudes upwardly from the case 12 via an opening, which is formed by the door portions 6a and 6b of the airbag cover 6 being pushed to be open, and is deployed and inflated while protruding toward the rear side of the vehicle, and the inflation of the airbag is completed to block a space between the upper surface 2 of the instrument panel 1 and the windshield 4 above the instrument panel 1 as illustrated by the two-dot chain line in FIG. 1 and in FIG. 13.

In the airbag device M of the embodiment, the airbag 25 is configured such that the dummy inflation portion 54 is provided at a position approximately symmetrical to the discharge portion 45 at the time of inflating completion, but the dummy inflation portion 54 is configured to be inflated to partially protrude from the bag body 26 by the inflation gas flowing to the inside at the time of deployment and inflation of the airbag 25, regardless of the behavior of the discharge portion 45 (operation of the locking member 16). That is, in the airbag device M of the embodiment, the dummy inflation portion 54 is not connected to the opening/closing control device side, and only the connection member 110 extending from the discharge portion 45 is connected to the locking member 16 as the opening/closing control device. Therefore, it is possible to configure the device itself with a simple configuration as compared with an airbag device in the related art in which the dummy inflation portion is also connected to the opening/closing control device side. In the airbag device M of the embodiment, since the dummy inflation portion 54 is provided, in a case where the discharge portion 45 is inflated to protrude outwardly from the bag body 26 so as to open the exhaust hole 48 by releasing the connection between the connection member 110 and the locking member 16, the dummy inflation portion 54 also partially protrudes to be disposed at a position approximately symmetrical to the discharge portion 45, and thus the bag body 26 can be inflated right and left in a balanced manner. Further, in the airbag device M of the embodiment, in a case where the discharge portion 45 is inflated in a state of being drawn into the bag body 26 by the connection between the connection member 110 and the locking member 16 being maintained, only the dummy inflation portion 54 partially protrudes from the bag body 26, and the airbag 25 is inflated in an asymmetric state. However, since the volume of the dummy inflation portion 54 at the time of inflating completion is set to be smaller than the volume of the discharge portion 45 in a state where the exhaust hole 48 is open at the time of inflation, the bag body 26 can be stably inflated without greatly losing balance.

Accordingly, in the airbag device M of the embodiment, it is possible to accurately protect the occupant MP by the inflated airbag 25 with a simple configuration.

In the airbag device M of the embodiment, since the dummy inflation portion 54 is configured to have a flat shape at the time of inflating completion by setting a protrusion amount from the bag body 26 to be smaller than that of the discharge portion 45, the bag body 26 can be more stably inflated. Further, in the embodiment, since the dummy inflation portion 54 is disposed at a position closer to the front side than the discharge portion 45, that is, on the inlet opening 33 side (case 12 side), it is possible to suppress an influence of the dummy inflation portion 54 on the bag body 26 at the time of deployment and inflation.

Specifically, in the airbag device M of the embodiment, in a case where the control device 115 which receives signals from the predetermined sensors 116, 117, and 118 detects, for example, detects sitting of a small occupant MP1 or detects sitting of the occupant MP at a position close to the instrument panel 1, the control device 115 outputs an operation signal to the actuator 18 of the locking member 16 so as to retract the locking pin 17, approximately simultaneously with the operation of the inflator 8. As illustrated in FIG. 15, the airbag 25 is inflated in the open mode in which the discharge portion 45 protrudes from the bag body 26 to open the exhaust hole 48, and discharges the excessive inflation gas G through the exhaust hole 48 to complete the inflation. Therefore, since the airbag 25 discharges the excessive inflation gas G through the exhaust hole 48 to complete the inflation in a state where an increase in internal pressure is suppressed, it is possible to softly protect the small occupant MP1 or the occupant MP sitting close to the instrument panel 1 by suppressing pressing more than necessary by the airbag 25 of which the internal pressure is set to be small. At this time, in the airbag device M of the embodiment, since the dummy inflation portion 54 is inflated to partially protrude from the bag body 26 at a position approximately symmetrical to the discharge portion 45, the airbag 25 can be quickly inflated right and left in a balanced manner by suppressing the leaning of the airbag 25 to the left or right at the time of deployment and inflation, and thus it is possible to quickly and smoothly protect the occupant MP (small occupant MP1) by the airbag 25 of which the inflation is completed. It is difficult to stably receive the small occupant by the airbag inflated with lack of a right and left balance, and thus it is desirable to receive the small occupant by the airbag inflated right and left in a balanced manner.

Conversely, in a case where the control device 115 detects, for example, sitting of a large occupant MP2 or detects sitting of the occupant MP at a position away from the instrument panel 1, the control device 115 does not output an operation signal to the actuator 18. The airbag 25 is inflated in the block mode in which the side wall portions 46 and 47 around the exhaust hole 48 are pressed against each other in a state where the discharge portion 45 being drawn into the bag body is maintained and thus the exhaust hole 48 is blocked, and the inflation is completed in a state where the blocked state of the exhaust hole 48 is maintained as illustrated in FIGS. 13 and 14. Therefore, since the inflation of the airbag 25 is completed in a high internal pressure state in which the inflation gas is not discharged through the exhaust hole 48, it is possible to accurately protect the large occupant MP2 or the occupant MP sitting away from the instrument panel 1 without bottoming by the airbag 25 which is inflated with good cushioning by securing a sufficient internal pressure. The dummy inflation portion 54 is inflated even in the block mode, but in the airbag device M of the embodiment, since the volume of the dummy inflation portion 54 is set to be smaller than the volume of the discharge portion 45, even when the airbag 25 is inflated in an asymmetric state, the bag body 26 can be stably inflated without greatly losing balance, and thus it is possible to smoothly protect the occupant MP by the airbag 25 of which the inflation is completed. Specifically, in the airbag device M of the embodiment, since the dummy inflation portion 54 is configured to have a flat shape at the time of inflating completion by setting the area on the proximal portion side (opening area of a connection part with the bag body 26) to be greater than the area on the proximal portion side of the discharge portion 45 and setting the protrusion amount from the bag body 26 to be smaller than the protrusion amount of the discharge portion 45 from the bag body 26 at the time of inflation (refer to FIG. 14), in the inflation in the block mode, even in a case where only the dummy inflation portion 54 is inflated by partially protruding from the bag body 26, it is difficult for the dummy inflation portion 54 to be shaken with respect to the bag body 26 at the time of deployment and inflation of the airbag 25. Therefore, it is possible to suppress, as much as possible, that the bag body 26, which is deployed and inflated, is inflated while being shaken right and left. Unlike the small occupant, the large occupant can be stably received by the airbag inflated with slight lack of a right and left balance.

In addition, in the airbag device M of the embodiment, the central side binding part 58 is provided at the center in the right-left direction on the upper wall portion 28 disposed on the upper surface side of the bag body 26 at the time of inflating completion, to be along the front-rear direction, and the left side binding part 59 as the discharge-portion-side binding part disposed on the discharge portion 45 side and the right side binding part 60 as the dummy-inflation-portion-side binding part disposed on the dummy inflation portion 54 side are respectively provided on the left side and the right side of the central side binding part 58 such that edges 59a and 60a are bound to the central side binding part 58. However, as illustrated in FIG. 8, the binding parts of the left side binding part 59 and the right side binding part 60 with the central side binding part 58 (edges 59a and 60a) are disposed at positions shifted in the front-rear direction at the time of inflating completion of the airbag 25. Therefore, in the airbag device M of the embodiment, in the airbag 25 at the time of inflating completion, since it is possible to suppress that parts becoming bulky (harden) by binding the peripheral edges of the base material (edges 59a and 60a of the left side binding part 59 and the right side binding part 60) are disposed to be concentrated in the vicinity of the center, in the right-left direction, of a region on the upper surface side (upper wall portion 28) provided on the windshield 4 side, even in a case where the upper surface side of the airbag 25 at the time of inflating completion is provided to be close to the windshield 4, it is possible to suppress a damage on the windshield 4 due to the inflated airbag 25. If such points are not taken into consideration, a configuration in which the left side binding part and the right side binding part are bound to the central side binding part by approximately matching the positions thereof in the front-rear direction may be adopted.

In the embodiment, the passenger seat airbag device is described as an example, but the airbag device to which the invention can be applied is not limited to the embodiment, and the invention may be applied to, for example, an airbag device for a steering wheel.

What is claimed is:

1. An airbag device comprising:
an airbag which is folded and housed in a housing part, is configured to be inflated to protrude from the housing part by an inflation gas flowing to an inside of the airbag, and includes an exhaust hole through which some of the inflation gas flowing to the inside is discharged when the exhaust hole is open; and
an opening/closing control device disposed on a housing part side of the housing part and configured to control opening and closing of the exhaust hole,
wherein the airbag includes
a bag body which has a bag shape with flexibility and includes an inlet opening through which the inflation gas flows to the inside, and in which a peripheral edge of the inlet opening is connected to the side of the housing part,
a discharge portion having the exhaust hole,
a connection member which is disposed in the bag body, and of which a proximal portion side is connected to the discharge portion and a distal end side is connected to the opening/closing control device disposed near the inlet opening, and
a dummy inflation portion that is disposed at a position approximately symmetrical to the discharge portion with a part where the inlet opening is provided as a center, and is caused to be inflated by the inflation gas without connection to the opening/closing control device to partially protrude from the bag body at the time of inflation of the bag body,
the discharge portion is configured to maintain a blocked state of the exhaust hole by wall portions around the exhaust hole being pressed against each other in a state where the discharge portion is drawn into the bag body at the time of inflation of the bag body in a state where connection with the connection member is maintained, and is configured to protrude from the bag body by releasing the drawing into the bag body at the time of inflation of the bag body in a state where connection between the connection member and the opening/closing control device is released, to be inflated to separate the wall portions from each other by the inflation gas flowing to the inside to open the exhaust hole, and
a volume of the dummy inflation portion at the time of inflating completion is set to be smaller than a volume of the discharge portion in a state where the exhaust hole is open at the time of inflation.

2. The airbag device according to claim 1,
wherein the airbag is a passenger seat airbag that is folded and housed in front of a passenger seat,
the bag body has an approximately quadrangular pyramid shape of which an apex portion is disposed on a front end side, as a shape at the time of inflating completion, and includes an occupant side wall portion disposed on a rear end side as an occupant side at the time of inflating completion, along an approximately vertical direction, and a peripheral wall portion having a tapered shape which extends forward from a peripheral edge of the occupant side wall portion and converges toward the front end side,
the discharge portion and the dummy inflation portion are respectively provided in regions opposite in a right-left direction in the peripheral wall portion,
the bag body is formed of a base material made of a flexible sheet, and is configured such that at least a part of the peripheral wall portion is divided into approximately two of the discharge portion side and the dummy inflation portion side in the right-left direction,
in the peripheral wall portion, a discharge-portion-side part including the discharge portion is formed by binding peripheral edges of a pair of discharge-portion-side part constituting portions configured to divide the discharge-portion-side part in a front-rear direction,
in the peripheral wall portion, a dummy-inflation-portion-side part including the dummy inflation portion is formed by binding peripheral edges of a pair of dummy-inflation-portion-side part constituting portions configured to divide the dummy-inflation-portion-side part in the front-rear direction,
in the peripheral wall portion, a central side binding part which is provided along the front-rear direction by binding peripheral edges of the discharge-portion-side part constituting portions and the dummy-inflation-portion-side part constituting portions is provided in a region disposed on the upper surface side, and a discharge-portion-side binding part formed by binding the peripheral edges of the discharge-portion-side part constituting portions and a dummy-inflation-portion-side binding part formed by binding the peripheral edges of the dummy-inflation-portion-side part constituting portion are provided such that edges of the discharge-portion-side binding part and the dummy-inflation-portion-side binding part are bound to the central side binding part, and the discharge-portion-side binding part and the dummy-inflation-portion-side binding part are disposed at positions where binding parts to the central side binding part are shifted in the front-rear direction.

3. The airbag device according to claim 2, wherein the dummy-inflation-portion-side binding part is disposed to be closer to a front side than the discharge-side binding part.

4. The airbag device according to claim 3, wherein the dummy inflation portion is configured to have a flat shape at the time of inflating completion by setting a protrusion amount from the bag body at the time of inflating completion to be smaller than a protrusion amount of the discharge portion from the bag body at the time of inflating completion.

5. The airbag device according to claim 2, wherein the dummy inflation portion is configured to have a flat shape at the time of inflating completion by setting a protrusion amount from the bag body at the time of inflating completion to be smaller than a protrusion amount of the discharge portion from the bag body at the time of inflating completion.

6. The airbag device according to claim 2, wherein a right-left tether which regulates a width dimension of the bag body in the right-left direction at the time of inflating completion is disposed in the bag body, and the right-left tether is provided at a position behind the dummy inflation portion and the discharge portion at the time of inflating completion.

7. The airbag device according to claim 1, wherein the dummy inflation portion is configured to have a flat shape at the time of inflating completion by setting a protrusion amount from the bag body at the time of inflating completion to be smaller than a protrusion amount of the discharge portion from the bag body at the time of inflating completion.

\* \* \* \* \*